(12) United States Patent
Cola, Jr.

(10) Patent No.: US 10,961,598 B2
(45) Date of Patent: Mar. 30, 2021

(54) APPARATUS FOR MICROTREATMENT OF IRON-BASED ALLOY

(71) Applicant: Gary M Cola, Jr., Washington, MI (US)

(72) Inventor: Gary M Cola, Jr., Washington, MI (US)

(*) Notice: Subject to any disclaimer, the term of this patent is extended or adjusted under 35 U.S.C. 154(b) by 171 days.

(21) Appl. No.: 16/241,249

(22) Filed: Jan. 7, 2019

(65) Prior Publication Data

US 2019/0256937 A1 Aug. 22, 2019

Related U.S. Application Data

(62) Division of application No. 12/444,242, filed on Apr. 3, 2009, now Pat. No. 10,174,390.

(51) Int. Cl.
| | |
|---|---|
| *C21D 6/00* | (2006.01) |
| *C21D 1/08* | (2006.01) |
| *C21D 9/52* | (2006.01) |
| *C21D 9/46* | (2006.01) |
| *C21D 9/08* | (2006.01) |
| *C21D 1/667* | (2006.01) |
| *C21D 1/63* | (2006.01) |
| *C21D 1/62* | (2006.01) |
| *C21D 1/60* | (2006.01) |
| *C21D 1/52* | (2006.01) |
| *C21D 1/44* | (2006.01) |
| *C21D 1/42* | (2006.01) |
| *C21D 1/18* | (2006.01) |
| *C21D 1/10* | (2006.01) |
| *C21D 1/09* | (2006.01) |
| *C21D 9/54* | (2006.01) |

(52) U.S. Cl.
CPC ............. *C21D 6/00* (2013.01); *C21D 1/08* (2013.01); *C21D 1/09* (2013.01); *C21D 1/10* (2013.01); *C21D 1/18* (2013.01); *C21D 1/42* (2013.01); *C21D 1/44* (2013.01); *C21D 1/52* (2013.01); *C21D 1/60* (2013.01); *C21D 1/62* (2013.01); *C21D 1/63* (2013.01); *C21D 1/667* (2013.01); *C21D 9/08* (2013.01); *C21D 9/46* (2013.01); *C21D 9/52* (2013.01); *C21D 9/54* (2013.01); *Y02P 10/25* (2015.11)

(58) Field of Classification Search
CPC ..... C21D 6/00; C21D 1/08; C21D 1/09; C21D 1/10; C21D 1/18; C21D 1/42; C21D 1/44; C21D 1/52; C21D 1/60; C21D 1/62; C21D 1/63; C21D 1/667; C21D 9/08; C21D 9/46; C21D 9/52; C21D 9/54; Y02P 10/253
USPC ......................................................... 148/575
See application file for complete search history.

(56) References Cited

U.S. PATENT DOCUMENTS 10,174,390 B2 * 1/2019 Cola, Jr. ............... C21D 1/60

* cited by examiner

*Primary Examiner* — Edward M Johnson
(74) *Attorney, Agent, or Firm* — Cargill & Associates, PLLC; Lynn E. Cargill

(57) ABSTRACT

Iron-based alloys and articles in strips, sheets, workpieces and the like are converted into high strength steel with a minimum of cost, time and effort, including producing dual phase materials. This is achievable by extremely rapid micro-treating of low, medium, and high carbon iron-based alloys and articles by rapid heating and rapid cooling at least a portion of the alloy/article. This heating step involves nearly immediately heating the iron-based alloy to a selected temperature above its austenite conversion temperature. Then, the alloy is immediately quenched, also at an extremely fast rate, on at least a portion of the iron-based alloy in a quenching unit adjacent the heating unit. This procedure forms high strength alloy in a desired area, depending upon where the treatment was performed.

23 Claims, 23 Drawing Sheets

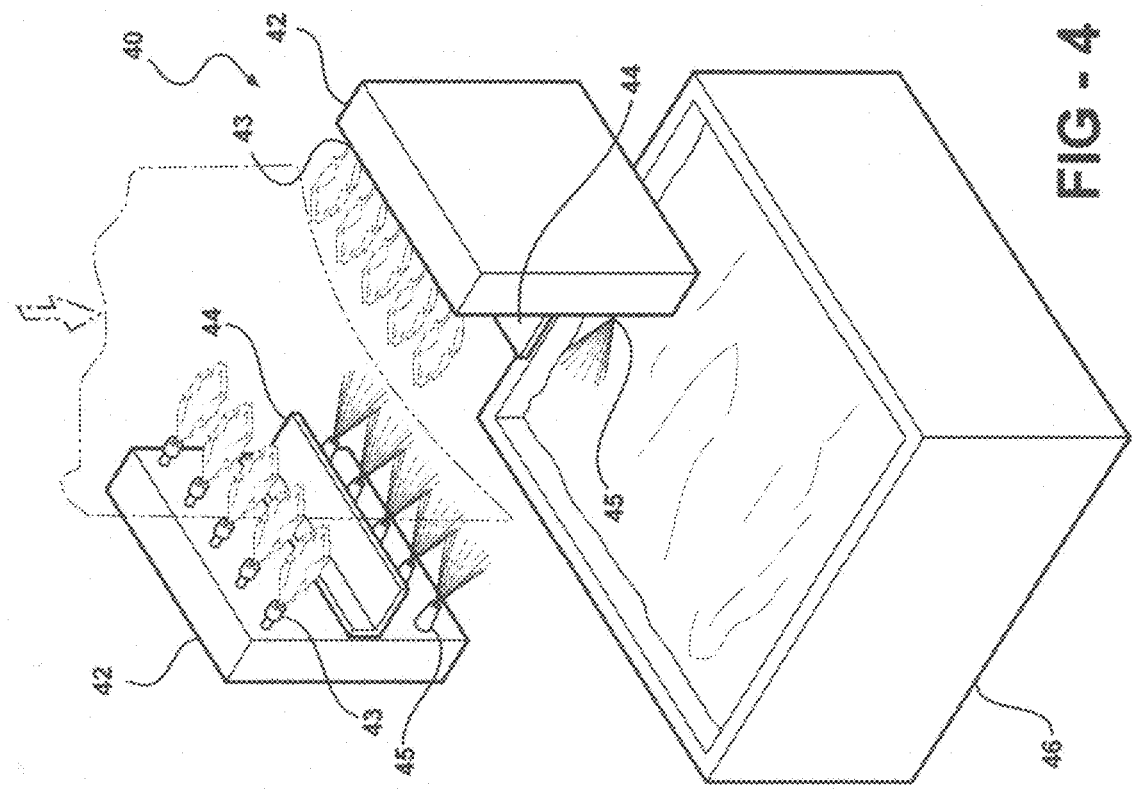
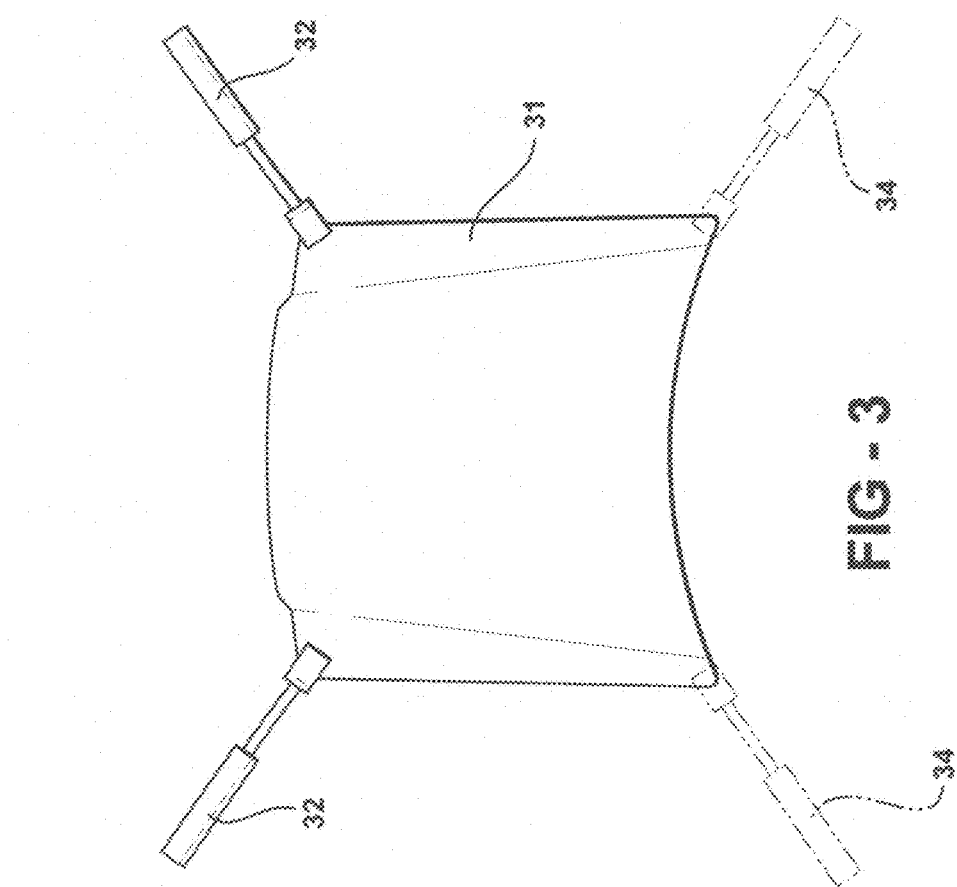

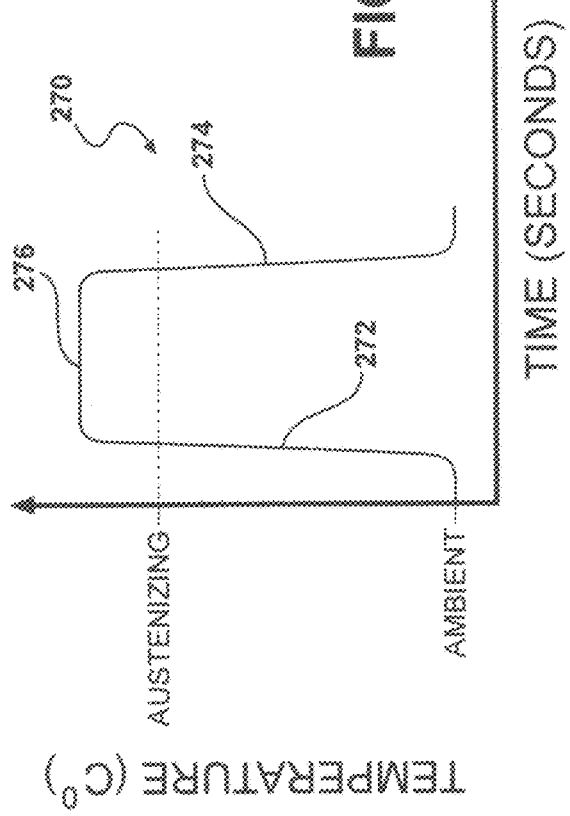
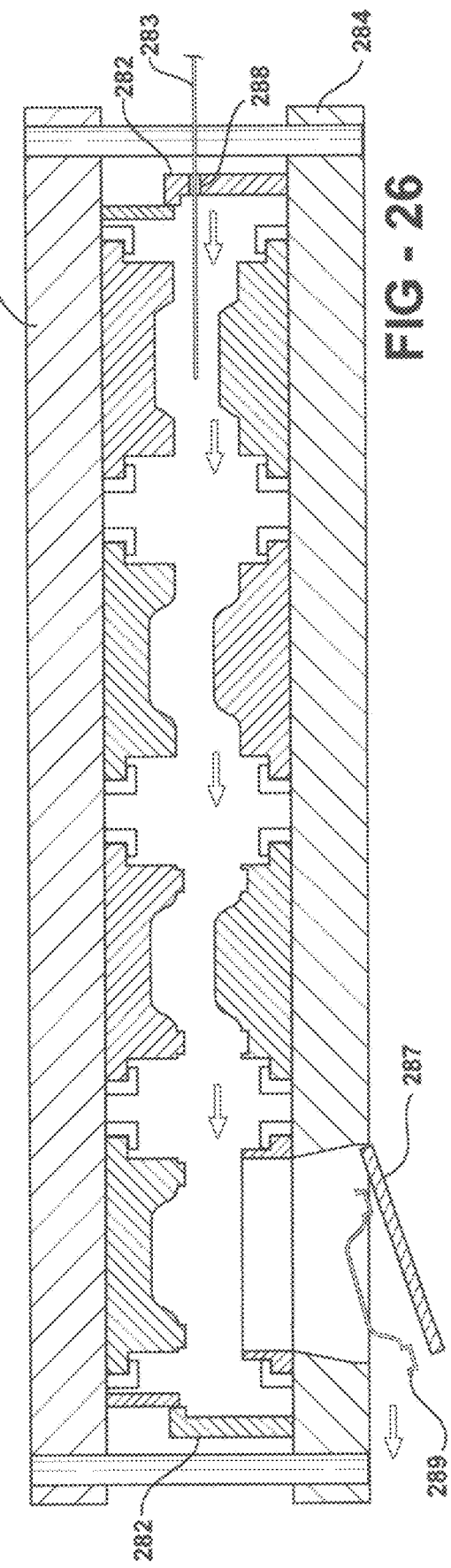

APPARATUS FOR MICROTREATMENT OF IRON-BASED ALLOY

CROSS REFERENCES TO RELATED APPLICATIONS

This application is a divisional application from co-pending U.S. patent application Ser. No. 12/444,242, filed on Apr. 3, 2009 and claims the benefit of priority under 35 U.S.C. 119(e) of U.S. Provisional Applications Nos. 60/827,929, 60/862,302, 60/886,826, 60/889,197, 60/889,221, 60/895,773, 60/917,551, 60/942,078, 60/953,841 filed on Oct. 3, 2006, Oct. 20, 2006, Jan. 27, 2007, Feb. 9, 2007, Feb. 9, 2007, Mar. 20, 2007, May 11, 2007, Jun. 5, 2007, and Aug. 3, 2007, respectively, which are incorporated herein by reference.

TECHNICAL FIELD

These inventions relate to treated iron-based alloys, and more particularly relate to processes and apparatuses for transforming low quality ferrous alloys into high strength steel.

BACKGROUND OF THE INVENTION

Traditionally, metallurgists have wanted to take low quality metals, such as ferrous alloys and low carbon steel, and turn them into high quality steels and more desirable products through inexpensive treatments, including annealing, quenching, and tempering to name a few. Previous attempts have met with limited success in that they did not always produce a desirable product. Other attempts have failed on a large scale due to high processing costs.

Processing of high strength steel generally takes heavy capital equipment expenditures, expensive and dangerous heated fluids, such as quenching oils and quenching salts, and tempering/annealing processes which include the use of ovens, heating equipment, and residual heat from pouring molten steel. These quenching procedures are intended to raise the hardness of the steel to a desirable value. Bainite and martensite are two high strength phases of steel that can be made by these processes and are very desirable materials for certain high strength applications as they generally have Rockwell C hardness of from about 30 and up. The increased hardness correlates to a comparable increase in tensile strength. From widely published charts, it is accepted that a low carbon steel with a Rockwell C hardness of 31 has a tensile strength of about 1005 MPa.

Typical advanced high strength steels include such bainitic and/or martensitic phases. Bainite is generally an acicular steel phase structured of a combination of ferrite and carbide that exhibits considerable toughness with high ductility. Usually formed by austempering, the bainite phase is a very desirable product. One practical advantage of bainitic steels is that relatively high strength levels can be obtained together with adequate ductility without further heat treatment, after the bainite reaction has taken place. Such steels, when made as a low carbon alloy, are readily weldable, and bainite will form in the heat-affected zone adjacent to the weld metal, thereby reducing the incidence of cracking. Furthermore, these steels having a lower carbon content tend to improve the weldability and reduce stresses arising from transformation. When traditional bainite is formed in medium and high carbon steels, weldability is reduced due to the higher carbon content. However, industry would find a great benefit in a high strength steel that is weldable.

The other conventional high strength steel, martensite, is another acicular steel phase made of a hard, supersaturated solid solution of carbon in a body-centered tetragonal lattice of iron. It is generally a metastable transitional structure formed during a phase transformation called a martensitic transformation or shear transformation in which larger workpieces of austenized steel may be quenched to a temperature within the martensite transformation range and held isothermally at that temperature to attain an equalized temperature throughout before cooling to room temperature. In thinner sections, martensite is often quenched in water.

Since chemical processes accelerate at higher temperatures, the strength associated with martensite is easily tempered/destroyed by the application of heat. In some alloys, this effect is reduced by adding elements such as tungsten that interfere with cementite nucleation, but, more often than not, the phenomenon is exploited instead. Since quenching can be difficult to control, most steels are quenched to produce an overabundance of martensite, and then tempered to gradually reduce its concentration until the right structure for the intended application is achieved. Too much martensite leaves steel brittle, whereas too little martensite leaves it soft.

It is a first aspect of the present invention to provide an inexpensive, quick and easy way to produce a low, medium, or high carbon iron-based alloy containing a high percentage of high strength steel while having some of the desirable mechanical properties of traditional bainite and/or martensite.

It is a second aspect of the present invention to provide a method and apparatus for micro-treating low, medium, or high carbon iron-based alloys to contain a desirable quantity of a new microstructure, including coalesced bainite, bainite and/or martensite or bainite itself, martensite itself, ferrite, pearlite, or combinations of the various materials thereof. The micro-treated low, medium, or high carbon iron-based alloy may have varying thicknesses for different applications and may be readily weldable while having high tensile strength, along with the ability to save material and reduce weight.

SUMMARY OF THE INVENTION

In accordance with the present invention, low grade ferrous alloys in strips, sheets, bars, plates, tubes, workpieces and the like are converted into high strength steel with a minimum of cost, time and effort. Dual and multiple phase materials are achievable by practicing the present invention.

Following the practices of the present invention, a new microstructure which this patent shall refer to as "Colascite", is made by treating iron-based ferrous alloys including low, medium, and high carbon steel and other iron-based alloys to this new steel microstructure. Therefore, the term "Colascite", shall hereinafter refer to the microstructure which may include portions of coalesced bainite, bainite, acicular ferrite, retained austenite, pearlite, ferrite and/or martensite and combinations thereof by micro-treating the iron based alloy.

Upon testing by several of the world's leading metallurgists, there is debate as to which of many known microstructures Colascite may most closely resemble. Therefore, the term "Colascite" will be incorporated through the remainder of this application to describe the individual microstructure, or combinations of those aforementioned, transformed in accordance with the present invention. The characteristics of "Colascite" will be described in more detail further hereinbelow with reference to photomicrographs depicting the new microstructure. Transmission electron microscopy, orientation image microscopy, and atom field ion probe microscopy have shown unique arrangements when compared to conventional microstructures. To the best knowledge of the inventor, some of the alloys tested resulted in distortion free presumed body centered cubic structure, while others displayed body centered tetragonal with limited distortion.

While commercially available ultra/advanced high strength steels have tensile strengths ranging up to 1400 Mpa, elongation of such steels tends to be at only 3%. In common use, many steels only have 800-1000 Mpa tensile strength but more elongation, ranging up to 10%. Elongation most often comes at a sacrifice in strength. In many cases these steels can only achieve their strength with the addition of increased carbon content, extensive alloying, and/or hot or cold working, including, but not limited to, continuous annealing. In order to make the 1400 Mpa/3% elongation steel example above, it is generally required to perform significant, cold working, martensitic transformation, subsequent tempering along with having, a carbon level of 0.18% wt to achieve such mechanical properties. The addition of carbon is usually detrimental to welding characteristics, so manufacturers prefer to see carbon levels of 0.13% wt. or less.

It is a desirable aspect of the present invention to provide a high strength steel that combines significantly high tensile strength with far superior elongation. Steels with 0.13% wt or less of carbon and very low alloy content transformed to Colascite using the described methods have exhibited more than 1400 Mpa average tensile strength exhibiting up to 7.6% elongation, with an average elongation of 6.5%. Other Colascite steels made from A1518620, have exhibited tensile strengths from 1500 to 1650 Mpa exhibiting with 5.5 to 7.6% elongation. This elongation is more than 2.5 times greater than the elongation of comparable strength martensitic steel. A1514130, another common commercial steel, transformed to Colascite, has 1850 Mpa tensile strength exhibiting an average elongation of over 6%, which is more than 3 times greater than the elongation of other 0.30% wt carbon steels that have a comparable high strength microstructure.

There are provided methods and apparatuses for extremely rapid micro-treating of low, medium, and high carbon iron-based alloys and articles made from and containing those alloys. The iron-based, or ferrous, alloys/articles start out having a first microstructure prior to the micro-treating, and are converted into a second microstructure by rapid heating and rapid cooling into high strength steels on at least a portion of the alloy/article. All ultralight metals, including aluminum, copper and magnesium exhibit a change in grain size and mechanical properties when microtreated under this process. It is expected that any metal will change its microstructure and mechanical properties to a certain extent when processed.

A method for rapidly micro-treating an iron-based alloy is disclosed for forming at least one phase of a high strength alloy, where the method comprises the steps of providing an iron-based alloy having a first micro-structure with an austenite conversion temperature. This first microstructure is capable of being transformed to an iron-based alloy having a second micro-structure including the above mentioned phases by rapidly heating at an extremely high rate, such as 315° C./sec to 3000° C./sec.

This heating step involves nearly immediate heating of the iron-based alloy to a selected temperature above its austenite conversion temperature. Then, the alloy is immediately quenched, also at an extremely fast rate, i.e. 315° C./sec to 6,000° C./sec on at least a portion of the iron-based alloy in a quenching unit adjacent the heating unit. This procedure forms at least one phase of a high strength alloy in a desired area, depending upon where the treatment was performed. Extremely rapid quenching will form at least one phase of a high strength alloy, as described more fully hereinbelow.

Quenching may be accomplished nearly instantaneously by various methods and apparatuses, including water baths, water sprays, chilled forming dies, air knives, open air convection, final operation chilled progressive dies, final stage chilled line dies, chilled roll forming dies, and quenching hydroforms among others.

In various aspects of the apparatus portions of the invention, various heating units are used, including stationary, hinged, and movable head heating units. These various types of heating units have found utility for the method, where the movable and hinged head heating units were helpful for following contours on workpieces having a non-planar configuration during the rapid heating step for heating the low carbon iron-based alloy to its desired selected elevated temperature. Computer control units help to move the heating units responsive to the surface configuration of the workpiece. In addition to the heating and quenching units, spaced first and second tensioning units may be positioned on opposite sides of the heating and quenching units for moving the iron-based alloy article through the heating and quenching units.

The resulting high strength steel may include at least one portion of the resulting high strength material made of Colascite, coalesced bainite, martensite, ferrite, austenite, pearlite, and/or dual phase combinations thereof, depending on the placement of the treatments described and claimed hereinbelow.

Dual phase materials can be made, such as a martensitic phase located next to a Colascite phase, or a ferritic phase in combination with a Colascitic phase. These highly desired dual phase materials are achievable in the same workpiece by quenching only in various patterns so that a pattern of high strength steel can be manufactured in desired areas across the surface and/or cross section of an article after it has been heated. By only quenching certain areas, various material phases are possible in various locations where desired.

BRIEF DESCRIPTION OF THE DRAWINGS

For a further understanding of the nature and advantages of the expected scope and various embodiments of the present invention, reference shall be made to the following detailed description, and shall be taken in conjunction with the accompanying drawings, in which like parts are given the same reference numerals, and wherein:

FIG. 3 shows a workpiece of ferrous alloy;

FIG. 4 is a view of an apparatus for processing a ferrous alloy in accordance with the present invention;

FIG. 25 is a temperature vs. time diagram illustrating the change of temperature during the heating and quenching steps for processing a specimen of ferrous alloy in accordance with the third embodiment;

FIG. 26 is a view of an apparatus for local environment heating and pressure forming a Colascite ferrous alloy in accordance with the fourth embodiment of this invention.

Figure 27:
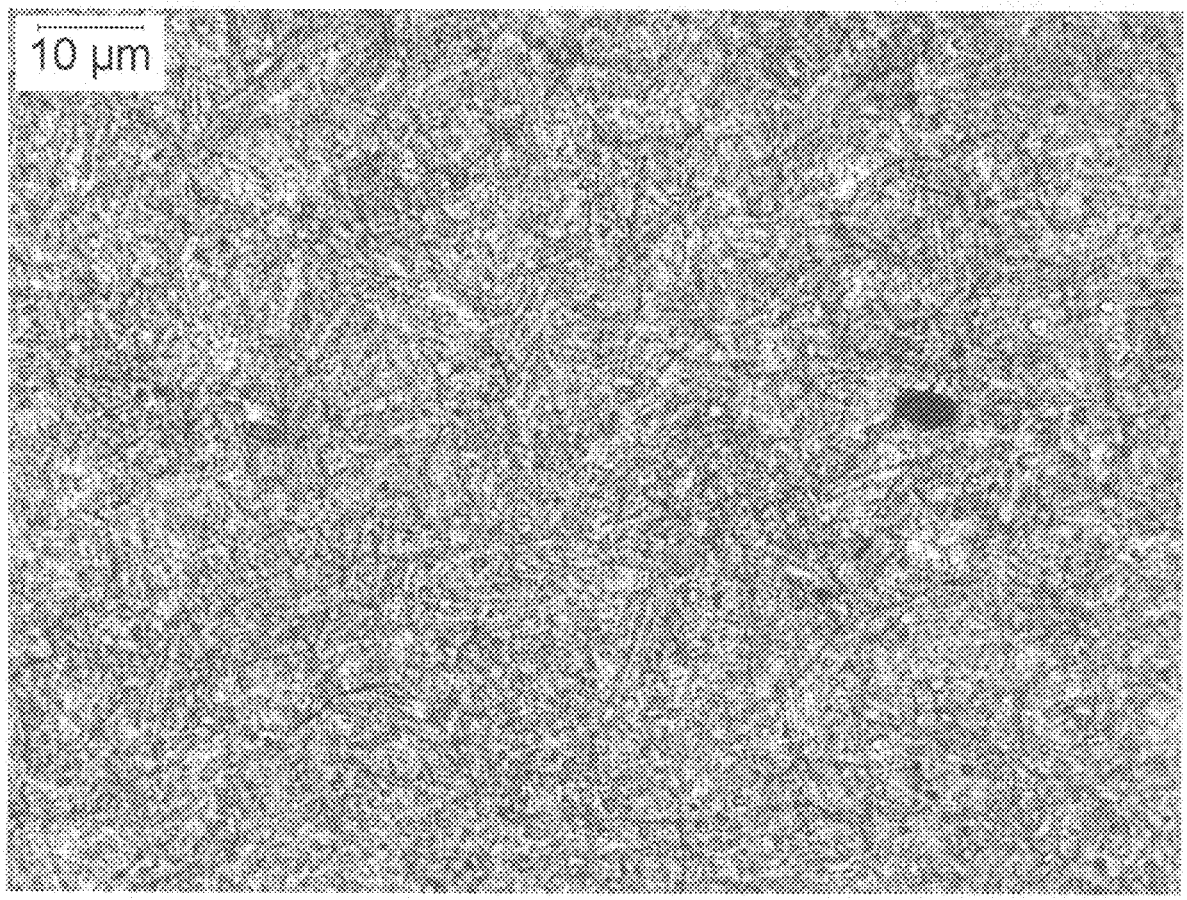
Figure 28:
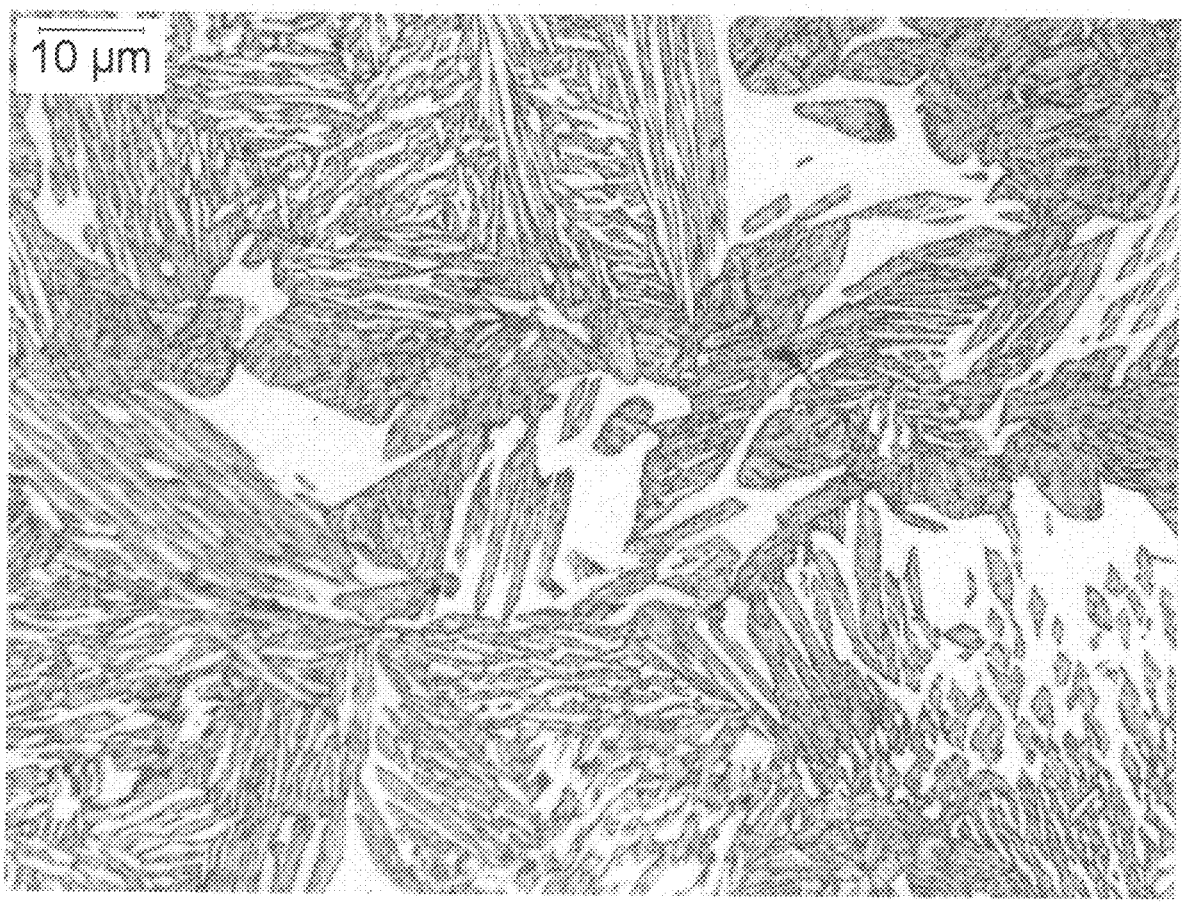
Figure 29:
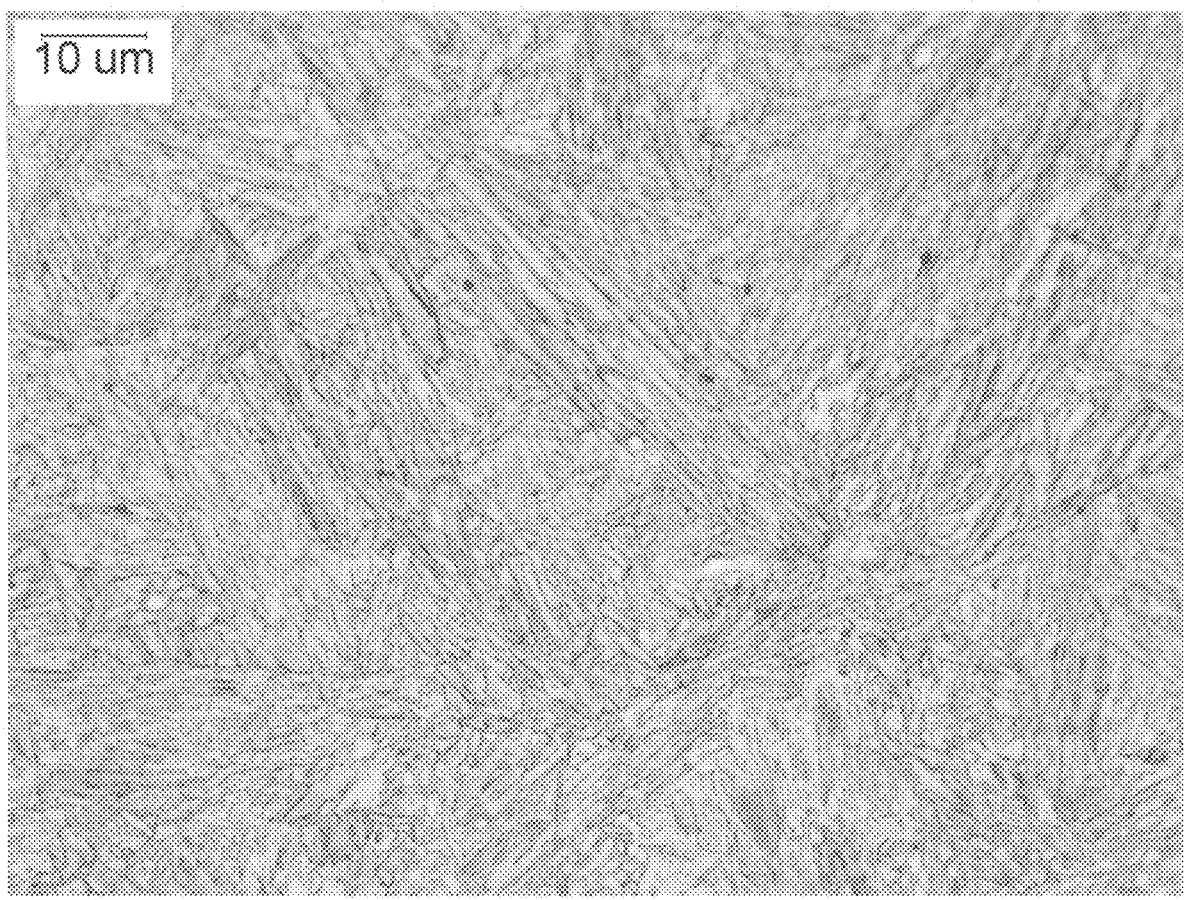
Figure 30:
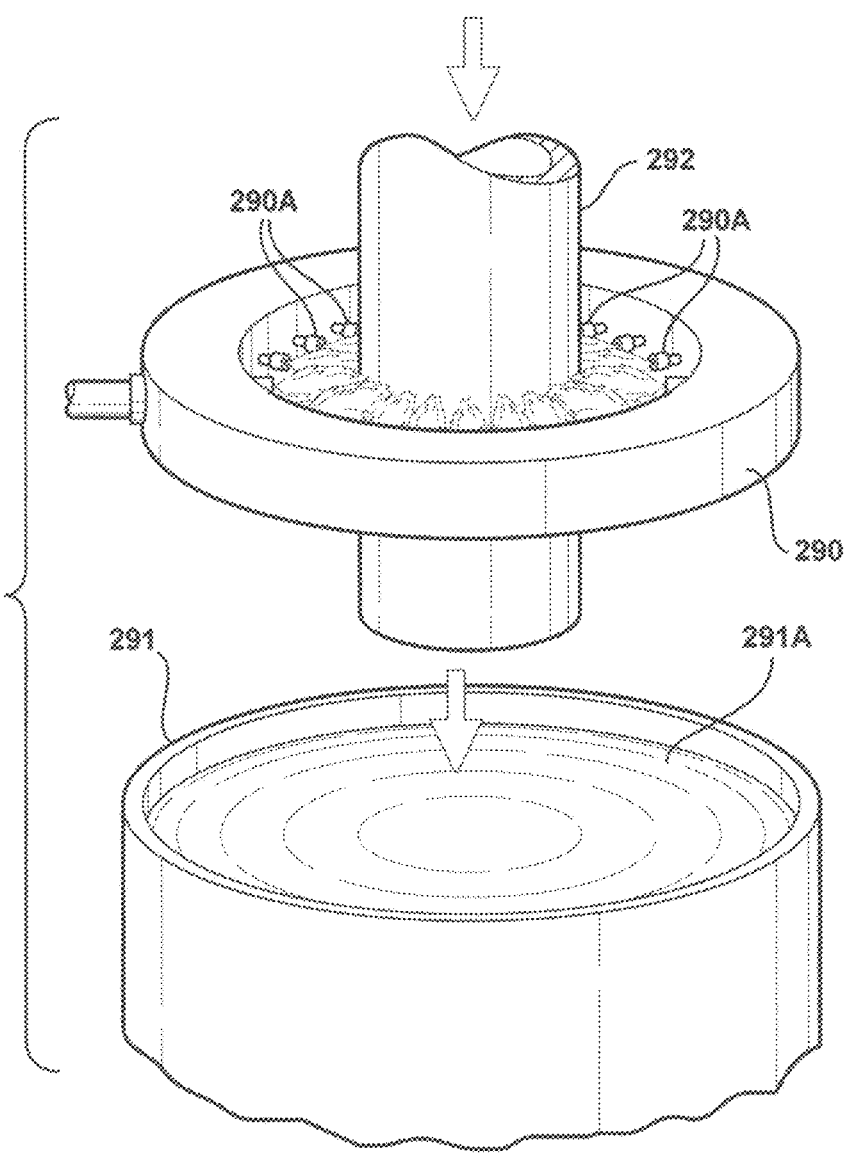
Figure 31:
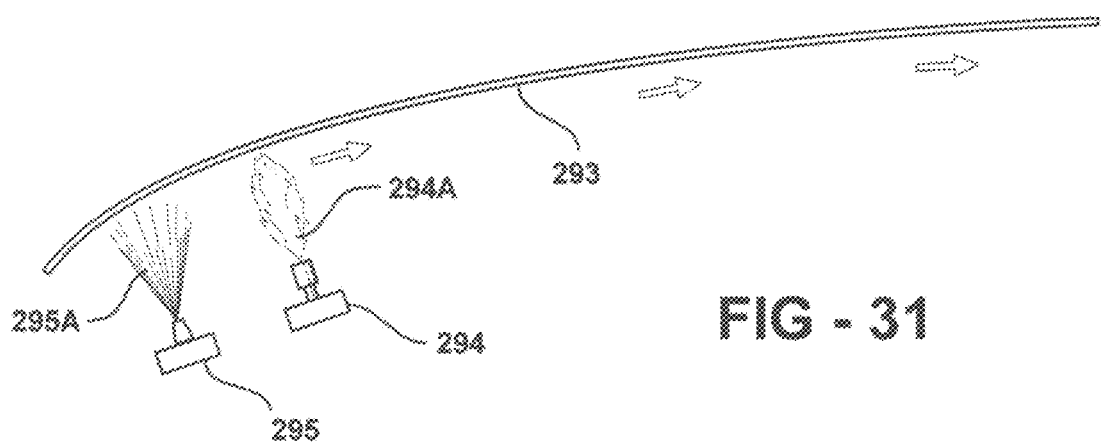
Figure 32:
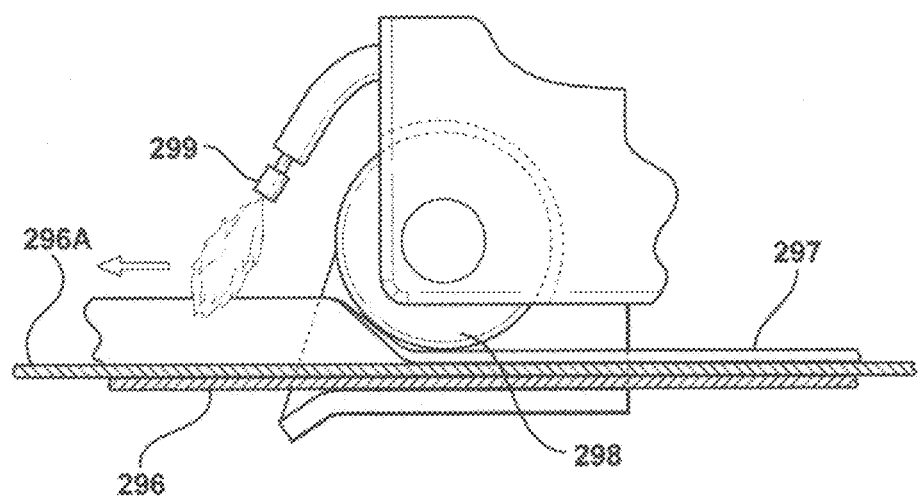
Figure 33:
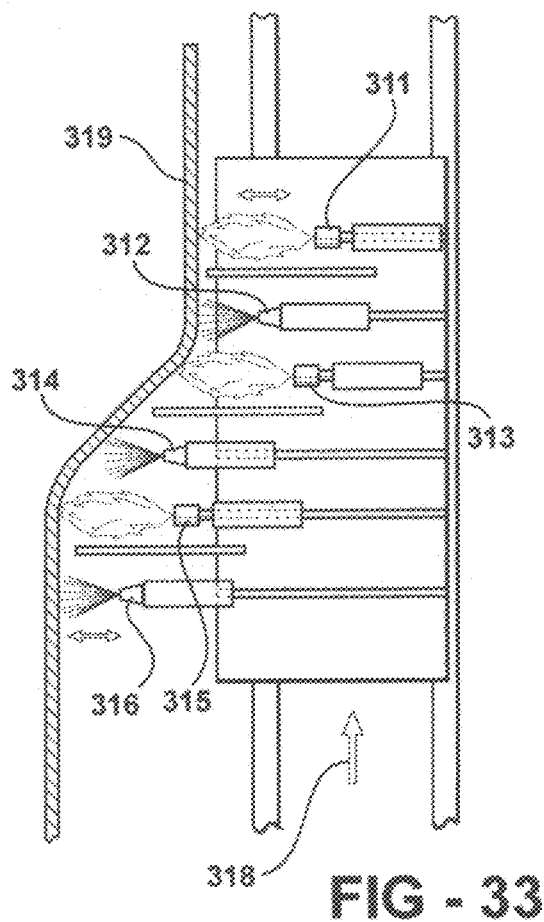
Figure 34:
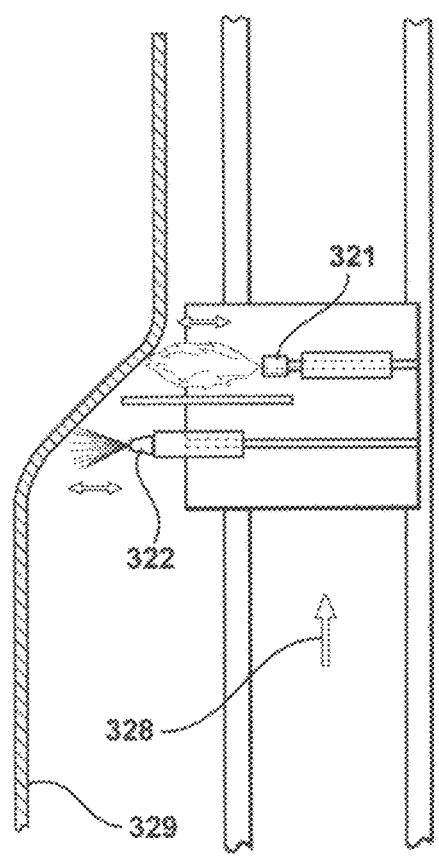

The second and third embodiments of the present invention are incorporated by reference;

FIG. 27 is a photomicrograph of the material made in accordance with the present invention;

FIG. 28 is a photomicrograph showing an identical precursor to FIG. 27, although it is austempered in molten salt to produce much larger grains;

FIG. 29 is a photomicrograph of an austempered alloy quenched with molten salt;

FIG. 30 is a side perspective view of a hollow tube being microtreated;

FIG. 31 illustrates an automotive hood being microtreated from only one side of the ferrous workpiece;

FIG. 32 is an automotive hood outer being roller hemmed over the hood inner in accordance with the second and third embodiments of the present invention;

FIG. 33 shows a side elevational view of a repeating heat and quench sequence obtained by a multiplicity of heat/quench apparatus; and FIG. 34 is a side elevational view of a convoluted configuration being subjected to movable heat and quench units which may run the path of motion multiple times to treat a given workpiece.

DETAILED DESCRIPTION OF THE INVENTION

Figure 1:
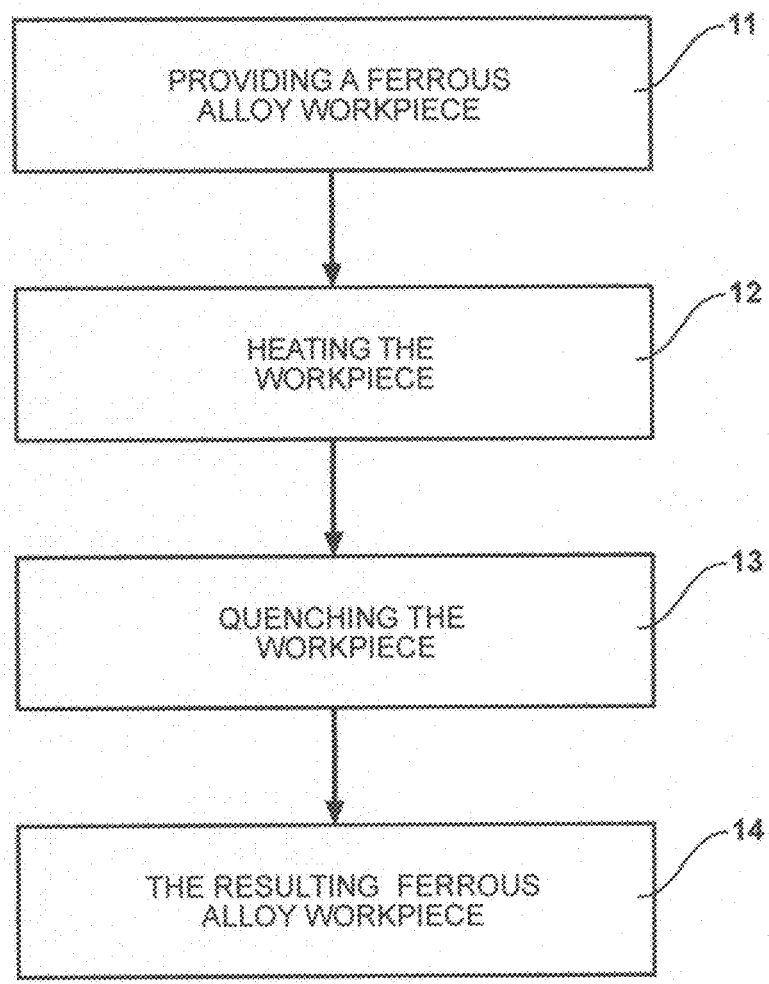
FIG. 1 is a flowchart of a process of making a Colascite article in accordance with the present invention.

The present invention discloses a method of making controllable high percentage high strength steels including Colascite, coalesced bainite, bainite, martensite, austenite, acicular ferrite, retained ferrite, pearlite and combinations thereof in ferrous alloys and several apparatuses of making the same. As shown in FIG. 1, the process of making Colascite in a ferrous alloy includes providing a ferrous alloy workpiece 11, extremely rapidly heating of the workpiece at least above the austenite conversion temperature 12 and then immediately quenching the workpiece to a sub-austenitic temperature, preferably ambient, within an extremely short period 13. In one aspect of the invention, this extremely rapid heating and immediate quenching can be performed entirely within less than a second, but may take several to many seconds. The transformed ferrous alloy workpiece 14 may have a preferred microstructure, comprising at least localized portions, of said workpiece that are made from about 5% to 100% Colascite. A transformed workpiece may be almost fully transformed to Colascite. Various factors, such as mechanical stresses, austenizing temperature, prior processing, the starting microstructure, and/or composition of the ferrous alloys being treated may affect the transformation of these high strength materials, along with the resulting grain size, and may further result in different concentrations of Colascite. To achieve yet another aspect of the present invention, an additional step of tempering or annealing may be optionally included to relieve stresses and prevent cracking of the resulting workpiece.

The process of the present invention may apply to various ferrous alloys. It is feasible to utilize the present invention on ferrous alloys in the form of strips, wires, sheets, plates, workpieces in different shapes, or hollow tubes, which can be used for flagpoles and bar stock as well. The method of making high strength material of the present invention may also apply to net shaped, or near-net shaped articles made of ferrous alloys. One useful ferrous alloy may contain carbon in the range of from about 0.001 percent carbon by weight (wt %) to about 4 percent carbon by weight (wt %). Another useful ferrous alloy may contain carbon in the range of 0.003 percent carbon by weight (wt %) to 2 percent carbon by weight (wt %). Yet another useful composition has a carbon content from about 0.1 wt % to about 0.7 wt %. In fact, a piece of AISI8620 converted to Colascite by heating to 1065° C. and immediately quenching in water yielded grain size of 5 to 7, elongation of 5-8%, strength 235 Ksi.

Figure 2A:
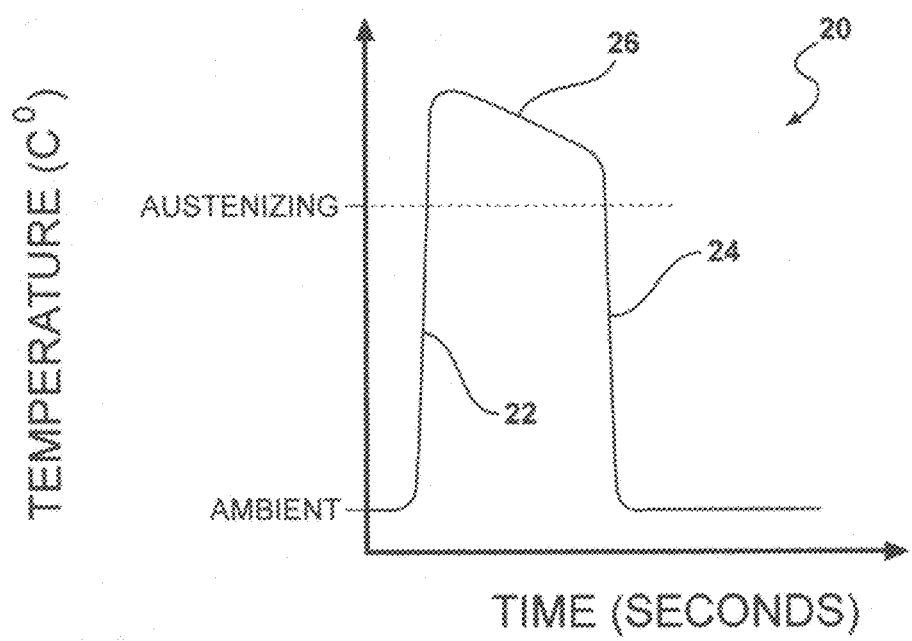
FIG. 2a is a temperature vs. time diagram illustrating the change of temperature during the heating and quenching steps for processing a specimen of ferrous alloy.
Figure 2B:
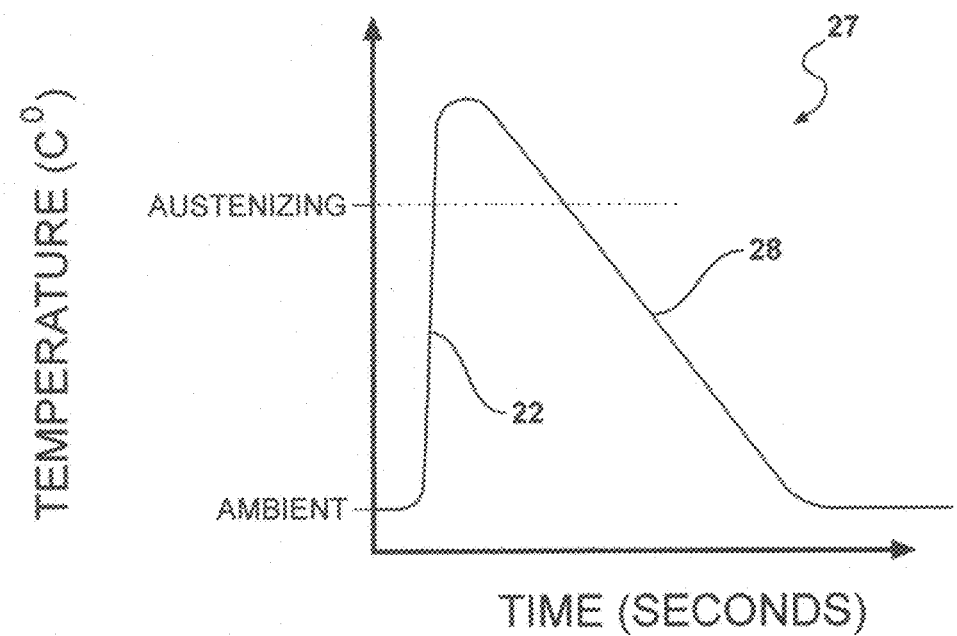
FIG. 2b is a second temperature vs. time diagram illustrating the change of temperature during the heating and quenching steps for processing a specimen of ferrous alloy.

FIG. 2 is a temperature vs. time diagram illustrating the change of temperature during the heating and quenching steps for one aspect of the invention for processing a workpiece of ferrous alloy. The graph of FIG. 2 plots time along the horizontal axis and temperature along the vertical axis. At the beginning of the process, the workpiece is at ambient temperature near normal room temperature. In any instance, an ambient temperature is a temperature that is sufficiently low so that significant metallurgical transitions will not occur in the workpiece, at least sub austenitic. Typically, ambient temperatures are below 122° F. (about 50° C.).

For illustrative purposes, the ferrous alloy workpiece is heated to follow a temperature gradient curve, generally indicated by the numeral 20. The temperature of the workpiece is rapidly increased on the positively sloped side 22 of the curve to a temperature of about 723° C. to about 1425° C., and reduced on the negatively sloped side 24 of the curve back to sub-austenitic, preferably ambient, at a rate of from about 315° C./sec to about 6,000° C./sec. For certain aspects of the present micro-treating invention, the length of time from ambient temperature up to the highest temperature and back down to ambient temperature is from about 0.05 sec. to about 30 sec. One of the useful aspects of the heating and cooling plateaus would be for them to be identical and nearly instantaneous, i.e. on the order of fractions of a second to several seconds, depending on the pull through rate of the workpiece in relation to the heating/quenching means. The maximum flow rate, and corresponding high strength steel formation rate, will ultimately be determined by the ability to fully heat and cool the iron based alloy with the heating methods provided for the operation. In other words, if a thick workpiece is being treated, the throughput rate would logically be slower, as the time it would take to heat the workpiece to a temperature above the austenitizing conversion temperature would take longer than a very thin piece.

For example, stamped out car door panels may be heated for less than 3 seconds up to a temperature of about 1290° C. and then immediately quenched back to ambient temperature within less than 3 seconds, thereby forming high strength areas of Colascite in the portions of the car door panel that were desired to be converted by heating and then immediately cooling only the portions of the panel that are desired to have high strength. However, these portions may comprise from 1% to 99% of such car door panel with respect to its total mass.

Still looking at FIG. 2, curve 22 represents the desired temperature gradient of the workpiece. In a first portion of a first aspect of the process, the workpiece is heated to a temperature at point 26 that is above the austenitizing temperature of the alloy comprising the workpiece. This temperature will vary dependent upon the particular alloy employed; however, one of ordinary skill in the art could readily determine what this temperature should be. Some cooling may occur in the time between the maximum desired temperature achieved and the initiation of quenching due to atmospheric convection cooling, hence the minor slope in the plateau 26. After being heated, the ferrous alloy is immediately quenched according to side 24 of the curve.

In several aspects of the present invention, the step of quickly heating the ferrous alloy at least above the austenite conversion temperature depends on the microstructure of the material in the starting alloy/article. In traditional plain-carbon steel, austenite exists above the critical temperature of about 723° C., while other alloys of steel have different eutectoid temperatures. The vast majority of ferrous alloys are in the austenitic condition at temperatures in excess of about 900° C. In this condition, the temperature in some aspects are above the austenite conversion temperature may be at least about 985° C. The ferrous alloys may optionally be pre-heated to a temperature below the austenitic conversion temperature in the range of about 315° C. to 705° C. without making any conversion from the first microstructure to a second microstructure before being heated above the austenite conversion temperature. Since the preheating step is below the austenite conversion temperature, the conversion will not take place until the rapid heating step above the austenite conversion temperature.

The step of cooling to the ambient temperature generally happens immediately after the ferrous alloy reaches the predetermined selected temperature that is above the austenite eutectoid temperature. The cooling rate depends on the moving rate of the ferrous alloys. In one aspect of the invention involving a fed-through strip of low carbon steel, the preferred cooling rate was about 315° C./sec to 6,000° C./sec, upon commencement of quenching, when the strip of ferrous alloy was moving at a rate of from about 7.00 IPM (inches per minute) to about 20.00 IPM. The heating and cooling of the present invention both happen in a short time, usually within seconds. Consequently, in this example, the heating rate was preferably from about 500° C./sec. to about 1000° C./sec., while the cooling rate was from about 500° C./sec to about 5,000° C./sec. A nearly fully Colascitic part results, having around 95% Colascite.

Experimentation has shown that the magnitude of the austenizing temperature achieved has a direct relation to the prior austenite grain size in a quenched Colascitic workpiece. Workpieces that have been rapidly austenized to a maximum of 1000° C. had a prior austenite grain size of 4 to 6, while those heated to 1320° C. had grain sizes of 1 to 3.

With differences in the cooling rate applied to different areas of this Colascitic article, various patterns of microstructure of austenite daughter phases can also be produced. Although initiation of cooling in most aspects will occur immediately to form Colascite, full cooling in specific areas may be allowed to occur more slowly to produce other austenitic daughter phases, which then yields a microstructurally patterned workpiece. For example, hard water quenching to ambient through water spray in only certain areas on the surface of the heated workpiece can yield Colascite in those areas. Other areas that are air cooled much more gently will return to ferrite. This will produce a bainite/ferrite patterned material. Curve 27 shows a rapid heating process 22 followed by a gentle cooling process 28, such as that which might be provided by atmospheric convection. Through varied controlled heating and cooling all known austenite daughter phases, including Colascite, can be made in the same steel blank where desired.

In the processing of conventional dual phase materials including austenite, traditional metallurgy defines the formation of austenite by the use of three parameters. First, a lower temperature region A1 where the austenite starts to form. Second, a middle temperature range A2 where some of the grains are transforming to austenite, and a third higher temperature region A3 with fully transformed austenite. Hence, by heating to various levels of temperature within A2, two phases are made, i.e. some of the grains will still be ferrite, while some will have transformed into austenite, yielding a dual phase ferrite/austenite mix. As one can imagine, a low A2 temperature would render a mostly ferritic phase, while a high A2 would include mostly austenite.

As dual/multi phase steels are currently made on continuous annealing lines, Colascitic steel sheet and workpieces could be created by reheating in accordance with the third embodiment of the present invention. The partially austenized sheet/workpiece could be quenched to yield a combination of highly tempered Colascite and other austenite daughter phases. If the temperature is rapidly raised to A2 followed by a rapid quench, a dual phase workpiece might be comprised of tempered Colascite and untempered Colascite. If the temperature is slowly raised to A2 and then hard quenched in oil, water, or some other suitable medium, the dual phase workpiece might be comprised of untempered martensite and tempered Colascite. If the temperature is slowly raised to A2 and then soft quenched or slowly air cooled, the dual phase workpiece might be comprised of tempered Colascite and a combination of pearlite, ferrite, martensite, retained austenite or other austenitic daughter phases. While the possible options are numerous, the goal of achieving multiphase steels is to combine the desirable mechanical properties of each of the phases present. The best example is a sheet/workpiece that forms easily but has elevated strength upon completion of forming, taking advantage of the mechanical properties of Colascite.

This distinction of rapid cooling versus gently cooling in at least portions of the workpiece yields a microstructurally patterned material that is very important to automobile makers these days to meet global warming and environmental criteria. Dual or multiple phases are achievable by tailor-making the cooling profile to produce different regions of different materials.

Looking now to FIG. 3, there is shown a workpiece 31 of ferrous alloy that is ready to be transformed to Colascite by one of the methods and apparatus of the present invention. The workpiece 31 is stamped into a shape of a car part, such as a hood. The workpiece is clamped by a pair of ceramic clamps 32 controlled by a computer (not shown). Optional clamps 34 may also be utilized if required to further stabilize the movement of the workpiece 31. The number of clamps is determined by the reaction of each individual part as it is processed and what is needed to restrain the part properly with respect to the equipment. A controller (not shown) may dip or move the workpiece 31 into an apparatus (see FIG. 4), including both a heating and a quenching zone, for transformation. The mode of movement of a workpiece is determined by the best way to transfer the material. For example, rollers may be employed for sheet, wire, workpieces, tubes, or rails.

FIG. 4 shows an apparatus, generally denoted by the numeral 40 for making Colascite in accordance of the present invention. The apparatus 40 includes a pair of combined heater and quencher devices 42 as well as a water catch bucket 46. The combined heater and quencher devices 42 may be controlled by a computer (not shown) to regulate the desirable heating and cooling. Each combined heater and quencher device 42 may include heating blaster nozzles 43, water spray heads 45 and a splash sheet 44 located therebetween. The blaster nozzles 43, which may be heated by propane gas, may be controlled by a volume controller (not shown) in order to raise the temperature of the workpiece from ambient temperature up to an austenite conversion temperature from about 723° C. to 1,430° C.

For this aspect, the workpiece is heated to about 900° C. to 1,290° C. before being quenched. The water spray heads 45 of the quencher emit cooling medium, preferably water, having a temperature from about 1° C. to 95° C. from a chiller (not shown) to cool the workpiece to ambient temperature.

In this embodiment, water catch bucket 46 collects and catches cooling water from the water spray heads 45 for recycling. Splash sheet 44 insulates the quenching from the heating, so that the steps of heating and quenching will not interfere with each other. Although in this embodiment the heating source is propane and the quenching medium is water, any suitable heating and quenching means may be used. It should be noted that, based on the particular iron based alloy used, there is a corresponding time between the applied heating and subsequent quench. Therefore, a direct relationship exists between the relative location of the heating and quenching means based on a given flow rate to achieve the proper transformation time (i.e. a faster flow rate will result in the heating and quenching apparatus being further apart).

This heating can be accomplished by any suitable means known in the art. For example, heating may be carried out in a fluidized bed, electric furnace, plasma furnace, microwave oven, or by an electric resistance heater, open environment propane forges, gas fired means, solid fuels, and torches. Other heating processes such as inductive heating, flame heating, radiant energy heating and the like may also be employed in the practice of the present invention. In some instances, it may be advantageous to measure the temperature of the workpiece during the heating step, and temperature information obtained thereby may be utilized to control the input of heat and/or parameters of the quench medium such as temperature, velocity, pressure and the like as appropriate, to allow for accurate temperature control. Such control may be carried out in a feedback mode or in an indirect mode.

This quench medium may comprise a simple fluid such as water, brine solutions, other water-based liquid, oil or the like. In some instances, it may be a liquefied or vaporized gas, or solid materials, such as powder or molten salt. The quench medium may be in the form of a bath in which the ferrous alloy article is immersed, or it may include a sprayed volume of fluid. If the quench medium is a liquefied or vaporized gas, it may comprise a gas including ambient air, an inert gas such as nitrogen, argon or the like, or a reactive gas such as a nitriding or carburizing gas. In any instance, the quench medium needs to be at a very low temperature compared to the heating temperature. The quenching medium is regulated so that the work piece can be cooled down to a sub-austenitic, preferably ambient, temperature within seconds.

Various heaters or/and quenchers can be used to heat the ferrous alloys. The heater and quencher may be stationary or movable. An example of stationary heaters is shown in FIG. 4. The heater including multi-nozzle heating heads, which may be used with a given cross section of ferrous alloys along a path of motion, provides variable heating temperature. On the other hand, movable heaters include many variations. Generally, there may be side-to-side movable heaters for contours; up and down movable heaters for heat variation; combined heater and quencher device for moving down to heat and cool, and then move back up for a reheat tempering/annealing treatment; hinged movable heaters or any combinations thereof. The details of the various heaters are disclosed below.

Side-To-Side Movable Heater

Figure 5A:
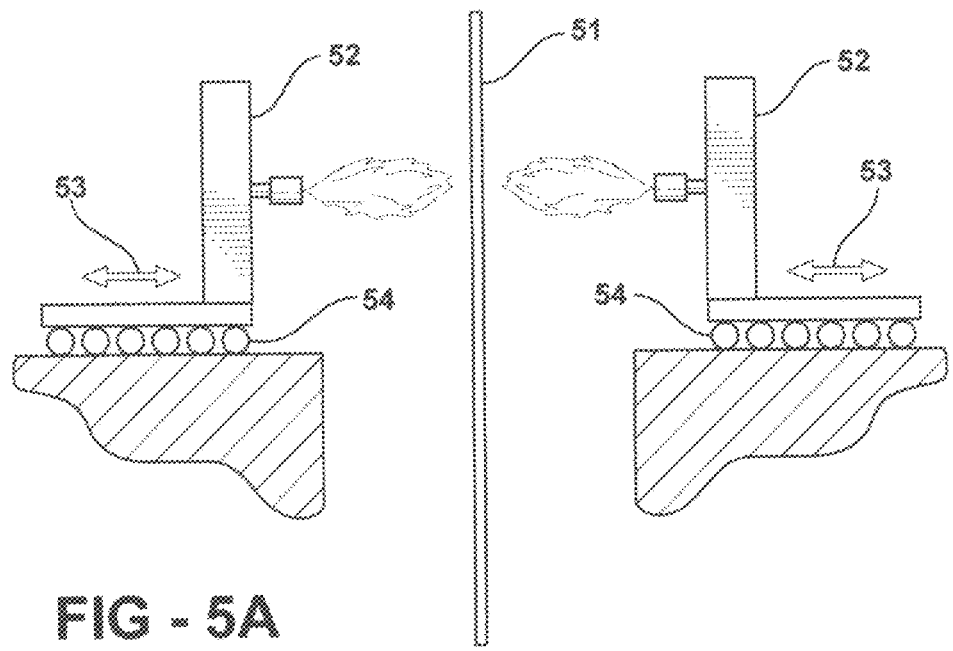
FIGS. 5A and 5B show various embodiments of a side-to-side movable heater in accordance with the present invention.
Figure 5B:
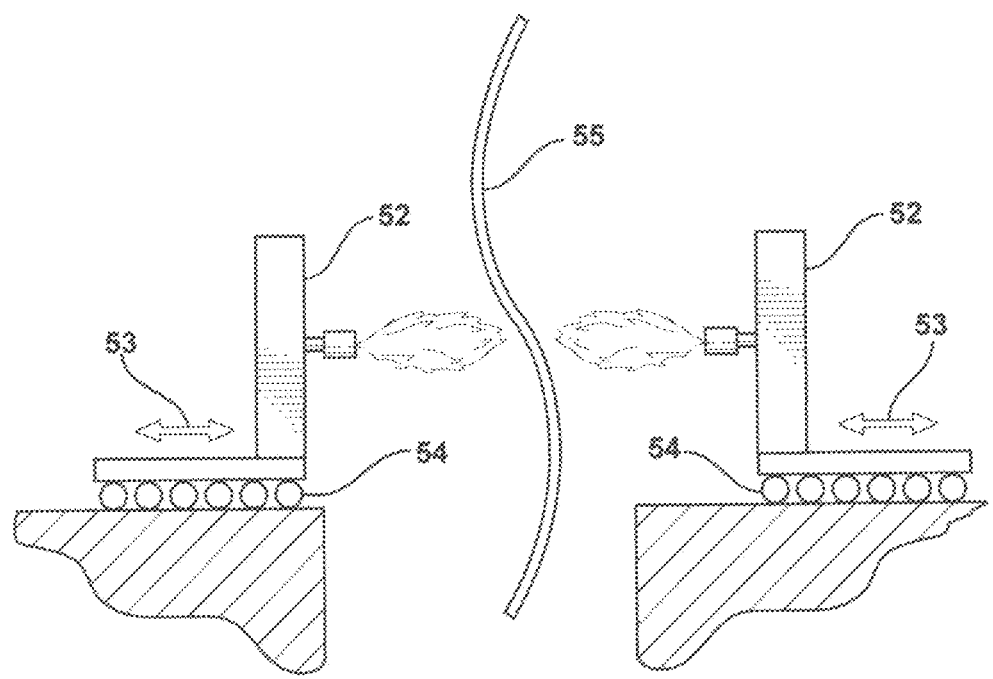

FIGS. 5A and 5B show a pair of side-to-side movable heaters 52 that may be used to heat a straight strip of ferrous alloy 51 or it may be configured so as to heat an S-shaped strip of ferrous alloy 55. The side-to-side movable heaters 52 of the present invention may utilize any suitable heating source. The preferred side-to-side movable heaters 52 may be conductive heaters or gas fired heaters. Any suitable device may be utilized to accomplish the side to side movement of the heater. For example, each of the side to side movable heaters 52 may be installed on a rolling bed with bearings that can move the heater in a horizontal direction shown by an arrow 53. The horizontal movement of the heaters may control the heating power of the heaters 52. The longer the distance between the heater and the ferrous alloy 51 or 55, the weaker the heating power required. For irregular workpieces, side-to-side movable heater 52 may be adjusted according to its contour for a stable heating process. An example is shown in FIG. 5B, where the heater 52 may adjust the distance between the moving ferrous alloy to maintain the same heating power.

Up And Down Movable Heater

Figure 6A:
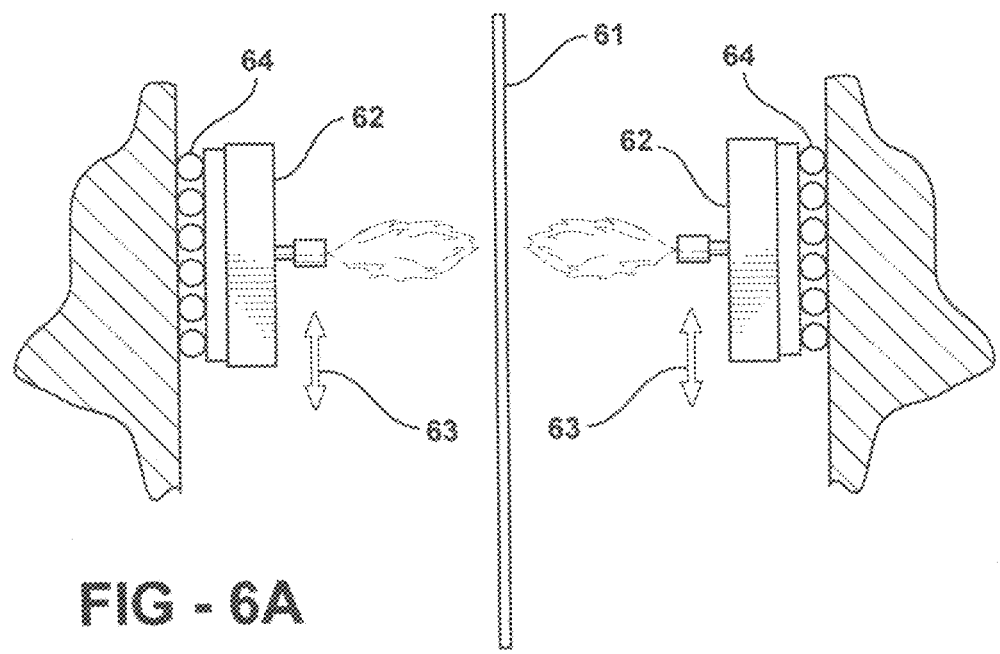
FIGS. 6A and 6B show a vertically oriented movable heater in accordance with the present invention.
Figure 6B:
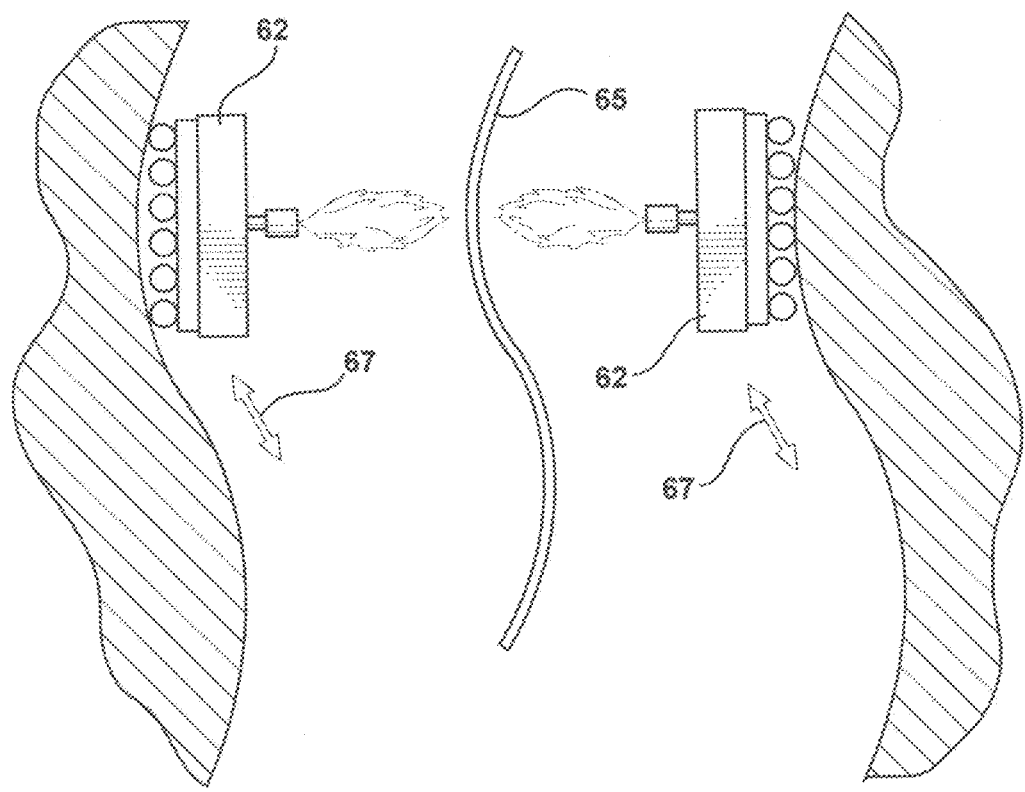

FIGS. 6A and 6B show a pair of up and down movable heaters 62 that are heating a straight strip of ferrous alloy 61 or an S-shaped strip of ferrous alloy 65. The up and down movable heaters 62 of the present invention may utilize any suitable heat means. The preferred up and down movable heaters 62 may be conductive heaters or gas fired heaters. Any conventional means may be utilized to make the heater movable. Here, as an example, each of the up and down movable heaters 62 is installed on a rolling bed with bearings that can move the heater 62 in a vertical direction as shown by arrow 63, or in an up and down direction as shown by arrow 67. The vertical movement of the heater 67 may control the heating location on the ferrous alloys. For a specific location where it is desired to form Colascite, the up and down heater 62 may concentrate the heating power on the chosen location. When a workpiece is non-straight, the up and down heater 62, may be adjustable to compensate for the contour. As shown in FIG. 6B for a non-straight strip of ferrous alloy, the heater 62 may follow the contour of the ferrous alloy to maintain the same heating effect.

Combined Movable Heater and Quencher

Figure 7:
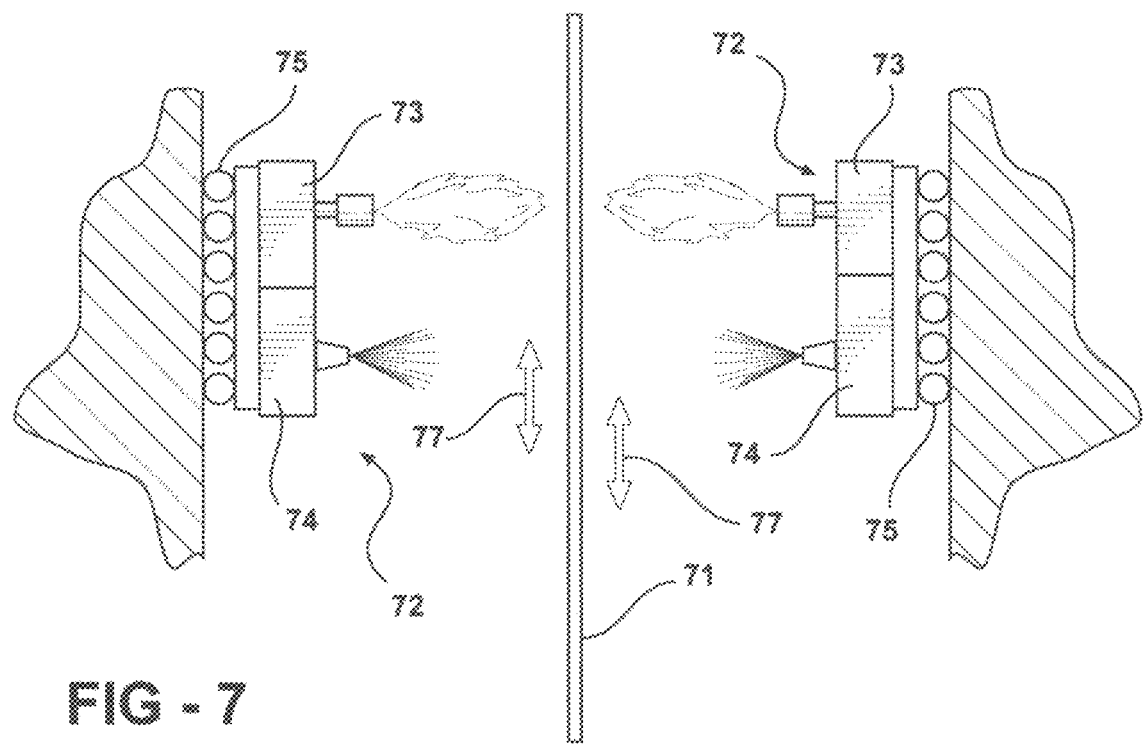
FIG. 7 shows still another embodiment of the movable heater of the present invention.

FIG. 7 shows a pair of combined movable heater and quencher devices, generally indicated by the numeral 72. Each of the combined movable heater and quencher devices 72 includes a heater 74 and a quencher 73. As an example, combined movable heater and quencher device 72 is installed on a rolling bed 75 with bearings that can move the combined movable heater and quencher 72 in a vertical direction as shown by arrows 77. This combined movable heater and quencher device 72 may move down to heat and quench a strip of ferrous alloy 71 within a close time, and then move back up for reheat if it is desired. The advantage of the combined heater and quencher may be that the heating and cooling zones are next to each other, so the heating and cooling happens immediately one after the other and Colascite may be transformed within a short period, on the order of seconds. Similarly, the vertical inverse of the aforementioned would also work. This meaning that a quenching means below a heating means with the combination moving upward to make Colascite and then back down for a reheat.

Hinged Movable Heaters and Quenchers

Figure 8:
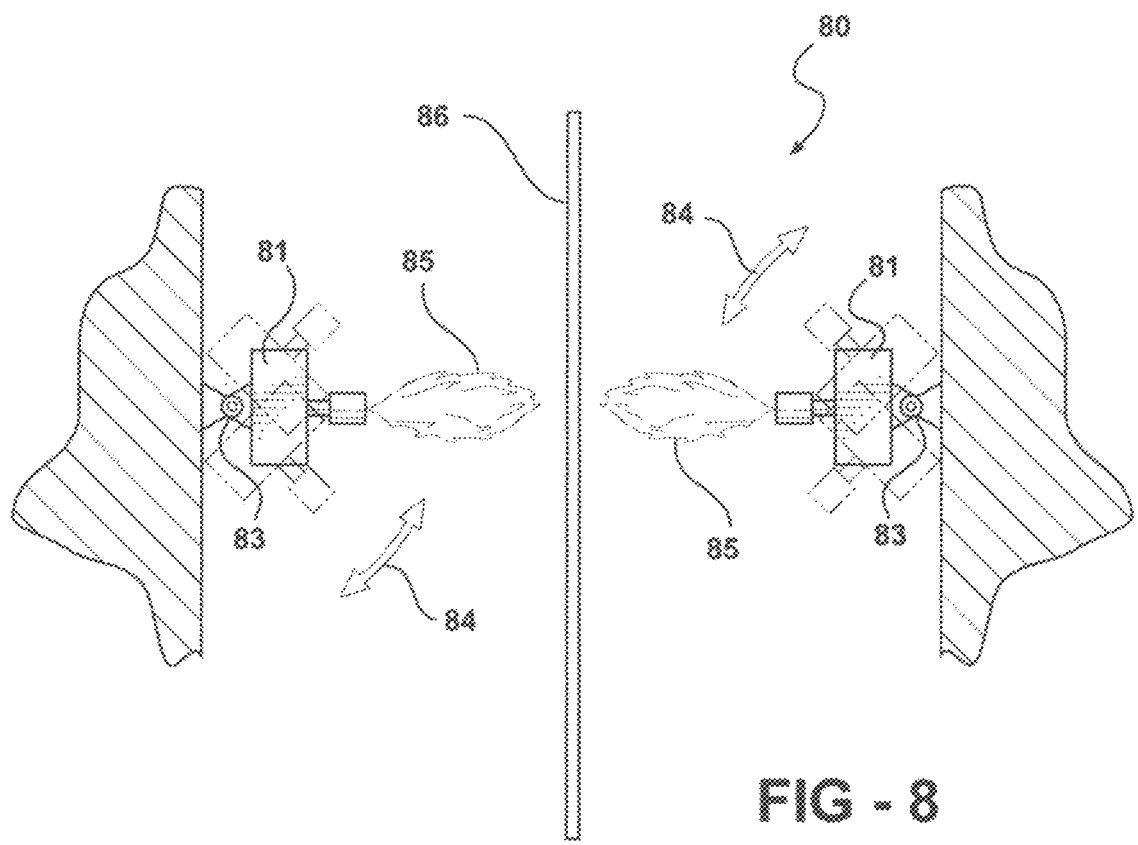
FIG. 8 shows a hinged movable heater in accordance with the present invention.

FIG. 8 shows a pair of hinged movable heaters of the present invention, generally indicated by the numeral 80. Each heater includes a heater plate 81, blaster nozzles 85 and a hinge 83. The hinged movable heater may be cocked back in a direction shown by an arrow 84, opposite to the heated ferrous alloy 86, to slow down the heating. A hinged quencher is also contemplated in a similar configuration to the hinged movable heater.

The articles made by the method of the present invention have many applications, such as railroad tracks, welded assemblies to be converted to high strength armor, marine applications, leaf springs, pressure formed stamped pieces for the automotive industry, and 1" to 84" wide Colascite coils of steel strip. In general, any iron based ferrous alloy article that would benefit from by incorporating the mechanical properties of a Colascitic microstructure is a candidate to consider.

Figure 9:
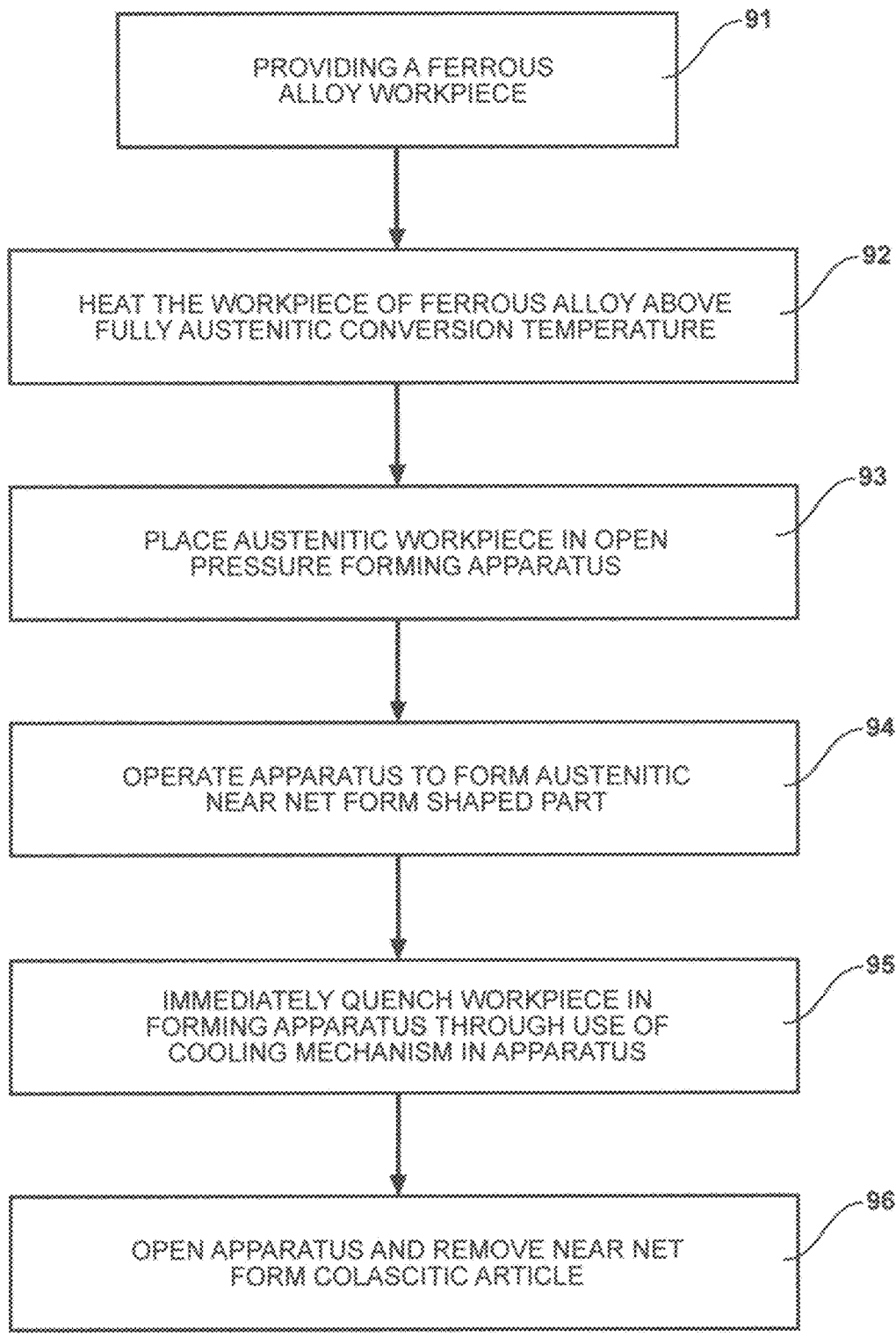
FIG. 9 is a flowchart of a process of making a Colascite article in accordance with the first embodiment of the present invention.

FIG. 9 shows another embodiment of the present invention and discloses a method of making controllable high percentage Colascite in ferrous alloy near net shape parts as well as an apparatus for making the same. As shown in FIG. 9, the process of making Colascite in a ferrous alloy includes providing a ferrous alloy workpiece 91, heating the workpiece, or portions of, at least above the austenite conversion temperature 92, placing the workpiece of ferrous alloy in the open die 93, closing the die in the stamping press (not shown) to form a near net shape part from the austenized workpiece 94, immediately quenching the workpiece to the ambient temperature through convection with the die itself acting as a heat sink, within a very short period 95, and then opening the die and removing the near net shaped Colascite stamped form 96. The transformed ferrous alloy workpiece 96 may have a preferred microstructure comprising at least about 5% to 100% Colascite. A useful transformed workpiece would have 50% to 98% Colascite. Various factors, such as stresses, temperature, and the composition of alloys may affect the transformation to Colascite, and its resulting grain size, and will also result in different concentrations of Colascite. A step of tempering or annealing may be optionally performed later to relieve stresses and prevent cracking of the resulting workpiece.

The process of the present invention may apply to various ferrous alloys. One ferrous alloy may contain carbon in the range of from about 0.001 percent carbon by weight (wt %) to about 4 percent carbon by weight (wt %). Another ferrous alloy may contain carbon in the range of 0.003 percent carbon by weight (wt %) to 2 percent carbon by weight (wt %), while the carbon content is may also be from about 0.1 wt % to about 0.7 wt %.

Figure 10:
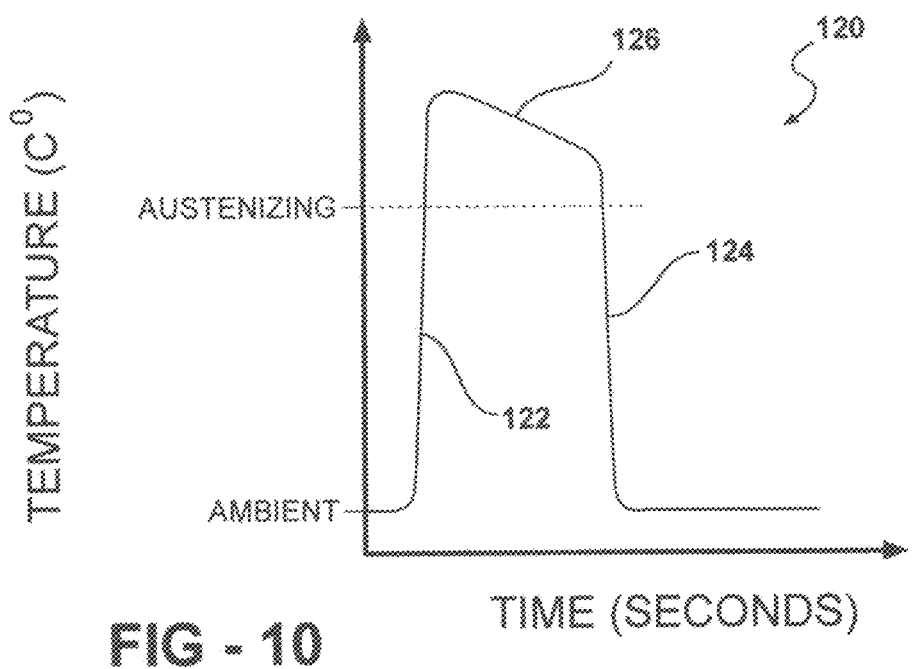
FIG. 10 is a temperature vs. time diagram illustrating the change of temperature during the heating and quenching steps for processing a specimen of ferrous alloy in accordance with the first embodiment.

FIG. 10 is a temperature vs. time diagram illustrating the change of temperature during the heating and quenching steps for processing a workpiece of ferrous alloy. The graph of FIG. 10 plots time along the horizontal axis and temperature along the vertical axis. At the beginning of the process, the workpiece is at ambient temperature, normal room temperature encountered in the workplace. In any instance, an ambient temperature is a temperature that is sufficiently low so that significant metallurgical transitions will not occur in the workpiece. Typically, ambient temperatures are below about 50° C.

For illustrative purposes, FIG. 10 shows where the ferrous alloy workpiece is heated to follow a temperature gradient curve, generally indicated by the numeral 120. The temperature of the workpiece is rapidly increased on the positively sloped side 122 of the curve to a temperature of about 723° C. to about 1430° C., and reduced on the negatively sloped side 124 of the curve back to ambient at a rate of from about 315° C./sec to about 6,000° C./sec. The length of time from ambient temperature up to the highest temperature and back down to ambient temperature is from about 0.05 sec. to about 30 sec. The preferred heating and cooling plateaus would identically be nearly instantaneous, i.e. on the order of fractions of a second to several seconds.

For example, sheets of ferrous alloy, or portions of, may be heated for less than 3 seconds to a temperature of about 900° C. to 1290° C., and then quenched by loading the sheets into a chilled quenching car door panel forming die. The die is subsequently closed to form a near net shape car door panel, and then immediately quenched back to ambient temperature by the cooling process of the chilled die itself within less than 3 seconds, thereby forming Colascite in the heated portions of the car door panel that were desired to be turned into Colascite. This process can form Colascite in a portion, or the entirety, of the formed door panel by heating only the approximate area of the sheet that is desired to have a Colascite microstructure.

Curve 122 represents the desired temperature gradient of the workpiece. In a first portion of the process, the workpiece is heated to a temperature at point 126 that is above the austenizing temperature of the alloy comprising the workpiece. This temperature will vary dependent upon the particular alloy employed; however, one of ordinary skill in the art could readily determine what this temperature should be. After being heated, the ferrous alloy is immediately quenched according to side 124 of the curve.

The step of quickly heating the ferrous alloy at least above the austenite conversion temperature is important. In plain-carbon steel, austenite exists above the critical temperature of about 723° C.; other alloys of steel have different eutectoid temperatures. The vast majority of ferrous alloys are in the austenitic condition at temperatures in excess of about 900° C. The preferred temperature above the austenite conversion temperature may be about at least about 985° C. The ferrous alloys may optionally be pre-heated to a temperature in the range of about 315° C. to 705° C. before being heated above the austenite conversion temperature.

The step of cooling to the ambient temperature generally happens immediately after the ferrous alloy reaches the predetermined selected temperature that is above the austenite temperature. The heating and cooling of the present invention both happen in a short time, usually within seconds. Consequently, the heating rate is preferably from about 300° C./sec. to about 4,000° C./sec., while the cooling rate is from about 315° C./sec. to about 5,000° C./sec.

Figure 11:
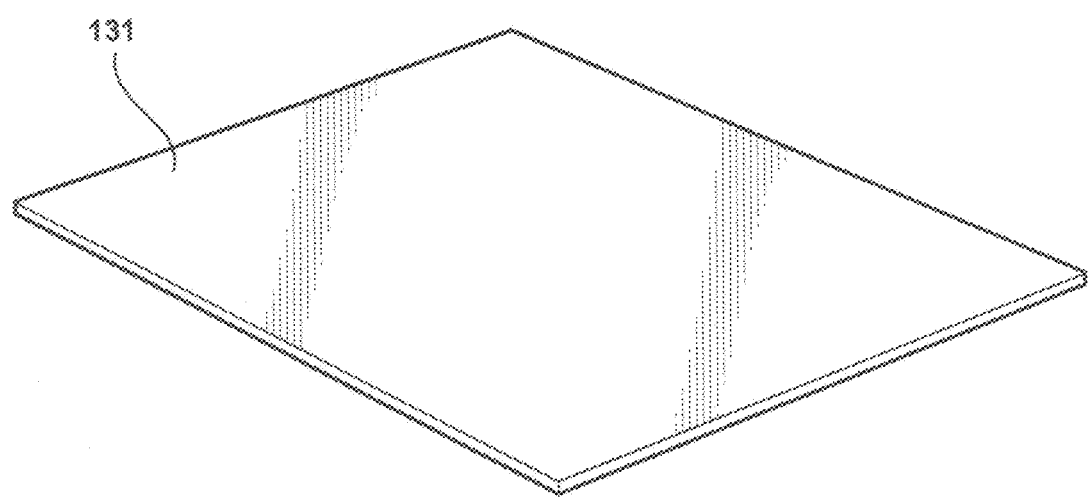
FIG. 11 shows a workpiece of ferrous alloy.

FIG. 11 shows a workpiece 131 of ferrous alloy that is ready to be transformed to Colascite by the method and apparatus of the present invention. The workpiece in this example is in sheet form, but could take many other forms. Examples of other cross sections are, but not limited to, I-beams, hollow tubing, C-channel, wire, railroad rails, angle iron, etc. A controller/robotic mechanism (not shown) may move the workpiece 131 into an apparatus (see FIG. 12), including both a heating zone and a forming/quenching die, for transformation.

Figure 12:
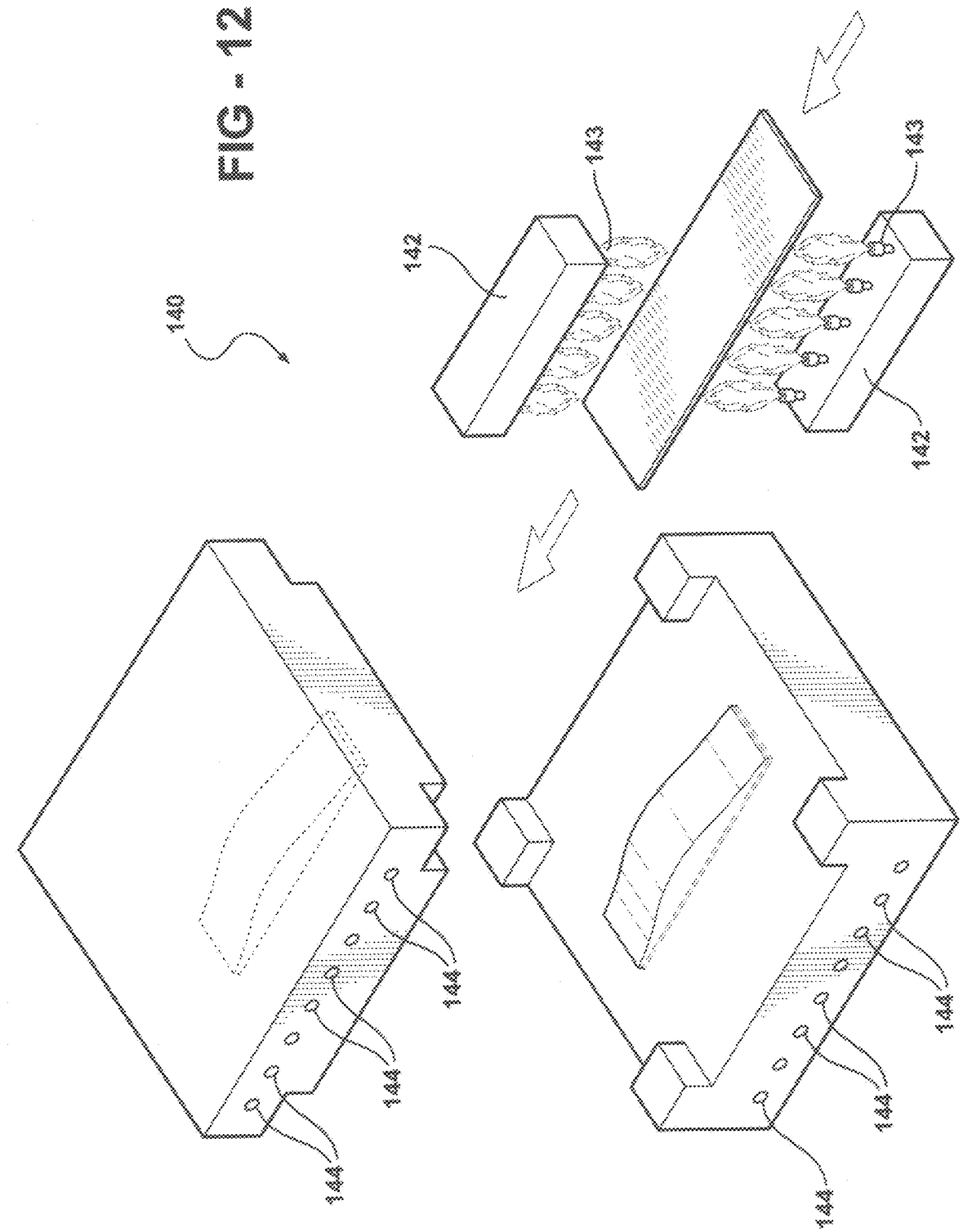
FIG. 12 is a view of an apparatus for heating and stamping a ferrous alloy in accordance with the first embodiment of the present invention.

FIG. 12 shows an apparatus, generally denoted by the numeral 140 for making a Colascite near net shape part in accordance of the present invention. The apparatus 140 includes a pair of combined heater devices 142 in order to fully austenize the material. The combined upper and lower heater units 142 may be controlled by a computer (not shown) to regulate the desirable heating. Each combined heater device 142 may include heating blaster nozzles 143. The blaster nozzles 143, which may be heated by propane gas, may be controlled by a volume controller (not shown) in order to raise the temperature of the workpiece from ambient temperature up to above austenite conversion temperature. In this aspect, the workpiece is heated to about 900° C. to 1290° C. before being loaded into the die, formed, and then finally quenched. The forming/quenching die has coolant 144, such as water, flowing through it. Coolant 144 will have sufficient heat transfer capability to keep the die cool at a temperature from about about 0° C. to 65° C. from a chiller (not shown). Although in this embodiment, the heating source is propane and the quenching medium is water, any suitable heating and quenching means may be used. It should be noted that, based on the particular iron based alloy used, there is a corresponding time between the applied heating and subsequent quench.

This die cooling quench medium may comprise a simple fluid such as water, or more complicated fluids, including brine solutions, pressurized gaseous coolants, other water-based liquid, oil or the like. In any instance, the quench medium needs to be at a lower temperature compared to the heating temperature. The quenching medium is regulated so that the work piece can be cooled down to the sub austenitic, preferably ambient, temperature within seconds.

Various heaters can be used to heat the ferrous alloys. The heater may be stationary or movable with respect to the stamping die. An example of stationary heaters is shown in FIG. 12. The heater including multi-nozzle heating heads provides variable heating temperatures, possibly different temperatures in different areas of the panel to be formed. The computer control of the heater may control the heating location on the ferrous alloys. For a specific location where it is desired to form Colascite, the heater may concentrate the heating power on the chosen location. Areas where Colascite is not desired can be heated to below the temperature required to form Colascite.

Figure 13:
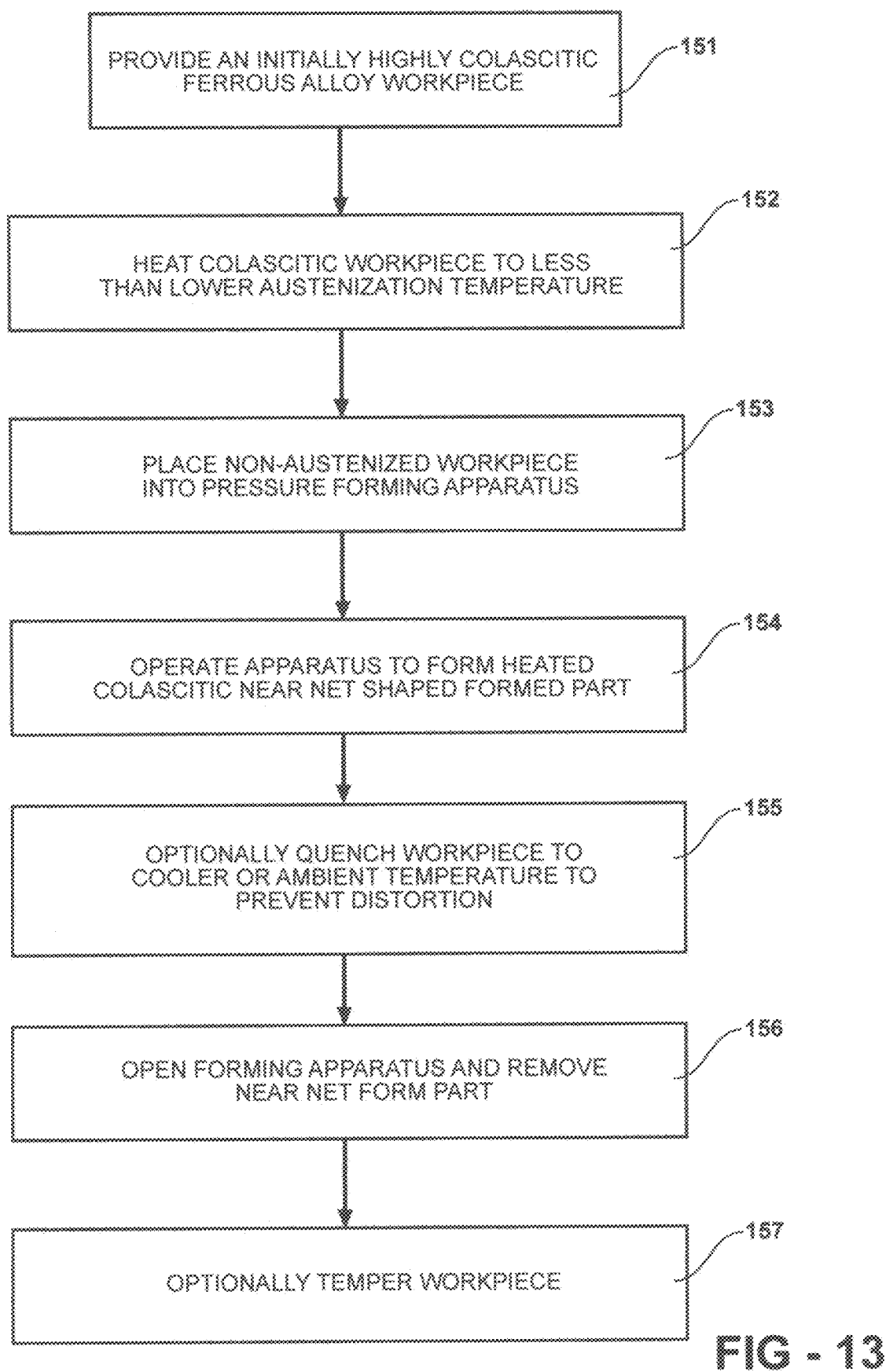
FIG. 13 is a flowchart of a process of making a Colascite near net shaped article in accordance with the second embodiment of the present invention.

The second embodiment of the present invention discloses a pressure forming method of making high percentage Colascite ferrous alloy near net shape part and an apparatus for making the same, denoted as "Warm Forming". As shown in FIG. 13, the process of making Colascite ferrous alloy near net shape part includes providing an initially Colascite ferrous alloy workpiece 151, heating the workpiece below the austenite conversion temperature 152, placing the non-austenized sheet of ferrous alloy in the open forming apparatus 153, operating the apparatus to form a near net shaped part from the non-austenized Colascite sheet 154, optionally quenching the workpiece to the ambient temperature, or some other determined temperature cool enough to prevent distortion of the part 155, and then opening the pressure forming apparatus and removing the near net shaped Colascite form 156. A step of tempering 157 may be optionally later included to relieve stresses and prevent cracking of the resulting workpiece. The temperature that the initially Colascite workpiece is heated to is that which affords enough ductility to properly form the part without tearing or otherwise distorting the sheet and damaging the resulting part. This temperature is most often between 315° C. and 705° C., but may deviate from this based on the chemical composition of the ferrous alloy being processed. The lower austenitic conversion temperature is to be avoided to prevent any Colascite from reconstituting back into austenite, which would compromise the finished part's integrity.

Experimentation has shown that Colascite has a desirable mechanical property among high strength steel microstructures in that it has the ability to retain a significant percentage of its "as quenched" strength after multiple thermal cycles to elevated temperatures. For example, an AISI 8620 alloy had an "as quenched" strength of 225 KSI. After multiple thermal cycles to 540° C., the steel retained more than 65% of its "as quenched" strength, still attaining 150 KSI. This is a desirable property as many other advanced high strength steels will temper to very low percentages of their prior strength when heated to this intensity due to their martensitic microstructure.

As with other aspects of the present invention, various resulting Colascite ferrous alloys may contain a Colascite microstructure in the range of from about 1 percent to about 99.999 percent by weight. Other ferrous alloys contain a Colascite microstructure in the range of 30 percent to about 97 percent by weight, while the Colascite microstructure content most exhibit is from about 50 percent to about 95 percent by weight.

Figure 14:
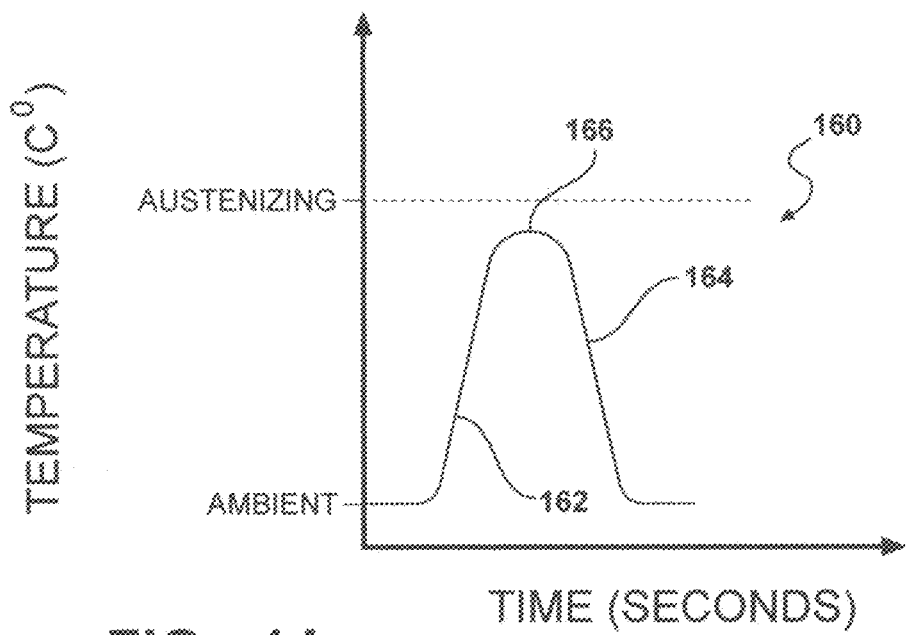
FIG. 14 is a temperature vs. time diagram illustrating the change of temperature during the heating and optional quenching steps for processing a specimen of Colascite ferrous alloy in accordance with the second embodiment.

FIG. 14 is a temperature vs. time diagram illustrating the change of temperature during the heating and optional quenching steps for processing a workpiece of Colascite ferrous alloy. The graph of FIG. 14 plots time along the horizontal axis and temperature along the vertical axis. At the beginning of the process, the workpiece is at ambient temperature, such as a normal room temperature encountered in the workplace. In any instance, an ambient temperature is a temperature that is sufficiently low so that significant metallurgical transitions will not occur in the workpiece. Typically, ambient temperatures are below about 50° C.

For illustrative purposes, the ferrous alloy workpiece is heated to follow a temperature gradient curve, generally indicated by the numeral 160. The temperature of the workpiece is increased on the positively sloped side 162 of the curve to a temperature of about 315° C. to about 705° C., and reduced on the negatively sloped side 164 of the curve back to ambient at a rate of from about 1° C./sec to about 540° C./sec.

For example, a sheet of Colascite ferrous alloy may be heated for less than 3 seconds to a temperature of about 540° C., loaded into the car door panel forming die, the die subsequently closed to form a near net shape car door panel, and then optionally quenched back to ambient temperature by the cooling process of the chilled die itself. Reducing the temperature to a level at which the steel is less pliable is desirable to prevent the mechanism that removes the car door panel from the die from causing damage to the near net shape panel.

Curve 162 represents the desired temperature gradient of the workpiece. In a first portion of the process, the workpiece is heated to a temperature at point 166 that is below the austenizing temperature of the alloy comprising the workpiece. This temperature will vary dependent upon the particular alloy employed; however, one of ordinary skill in the art could readily determine what this temperature should be. After being heated, the ferrous alloy is optionally quenched according to side 164 of the curve.

Figure 15:
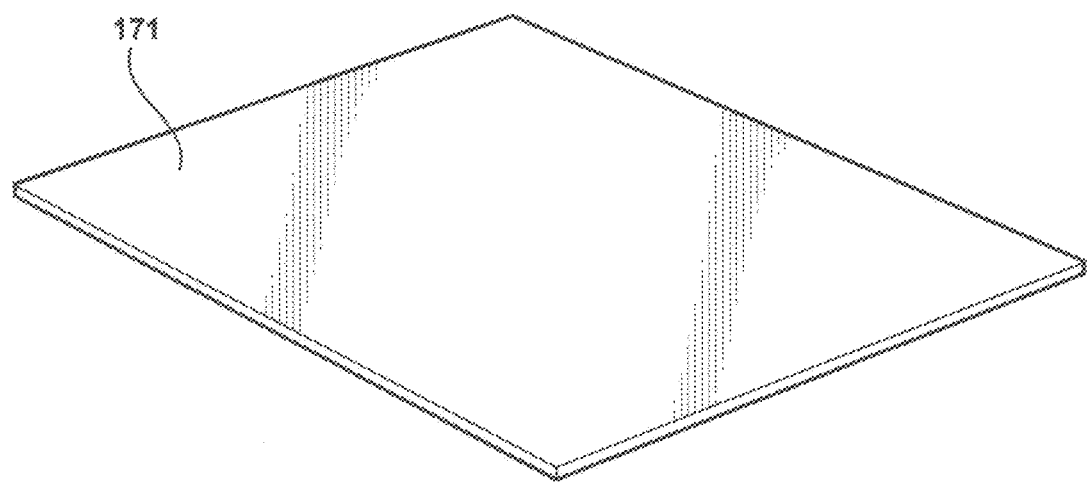
FIG. 15 shows a workpiece of Colascite ferrous alloy.

FIG. 15 shows yet another aspect where a ferrous alloy workpiece 171 is ready to be transformed to a near net shaped part by the method and apparatus of the present invention. The workpiece in this example is in sheet form, but could take many other forms. Examples of other cross sections are, but not limited to, I-beams, hollow tubing, C-channel, wire, railroad rails, angle iron, etc. A controller/robotic mechanism (not shown) may move the workpiece 171 into an apparatus (see FIG. 16), including both a heating zone and a forming/quenching die. The mode of movement of a workpiece into the die is determined by the best way to transfer the material. Manual labor, mechanized conveyance, and linear magnetism are just some of the possible ways those skilled in the art of material handling may choose from to transfer with little detrimental impact on the workpiece.

Figure 16:
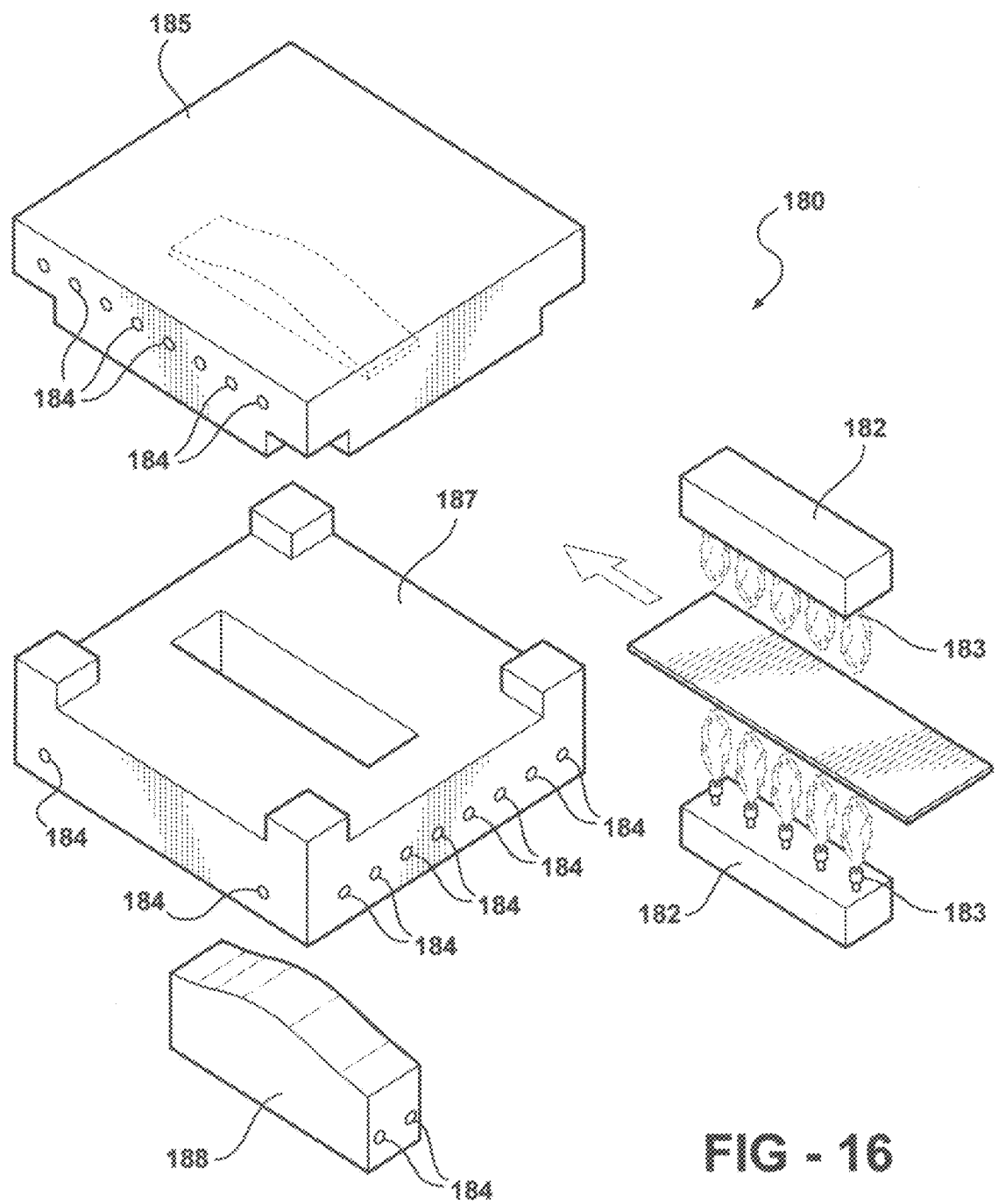
FIG. 16 is a view of an apparatus for heating and stamping a Colascite ferrous alloy in accordance with the second embodiment of the present invention.

FIG. 16 shows an apparatus known as a stamping die, generally denoted by the numeral 180 for making a near net shape part in accordance with this aspect of the present invention. The upper die is denoted as 185. The lower forming punch can either be one solid block, denoted as 186, or a ring/punch combination, denoted as 187 and 188, to use well known "3-piece" forming technology. The apparatus 180 includes a pair of combined heater devices 182 in order to heat, while avoiding, austenizing the material. The combined upper and lower heater units 182 may be controlled by a computer (not shown) to regulate the desired heating.

Each combined heater device 182 may include heating blaster nozzles 183. The blaster nozzles 183, which may be heated by propane gas, may be controlled by a volume controller (not shown) in order to raise the temperature of the workpiece from ambient temperature up to a level below the austenite conversion temperature. The workpiece is heated to about 540° C. before being loaded into the die, formed, and then optionally later quenched. The forming/quenching die has coolant 184, preferably water, flowing through it. Coolant 184 will have sufficient heat transfer capability to maintain the die having a temperature from about 0° C. to about 65° C. from a chiller (not shown) to cool the die and work piece to ambient temperature.

Figure 17:
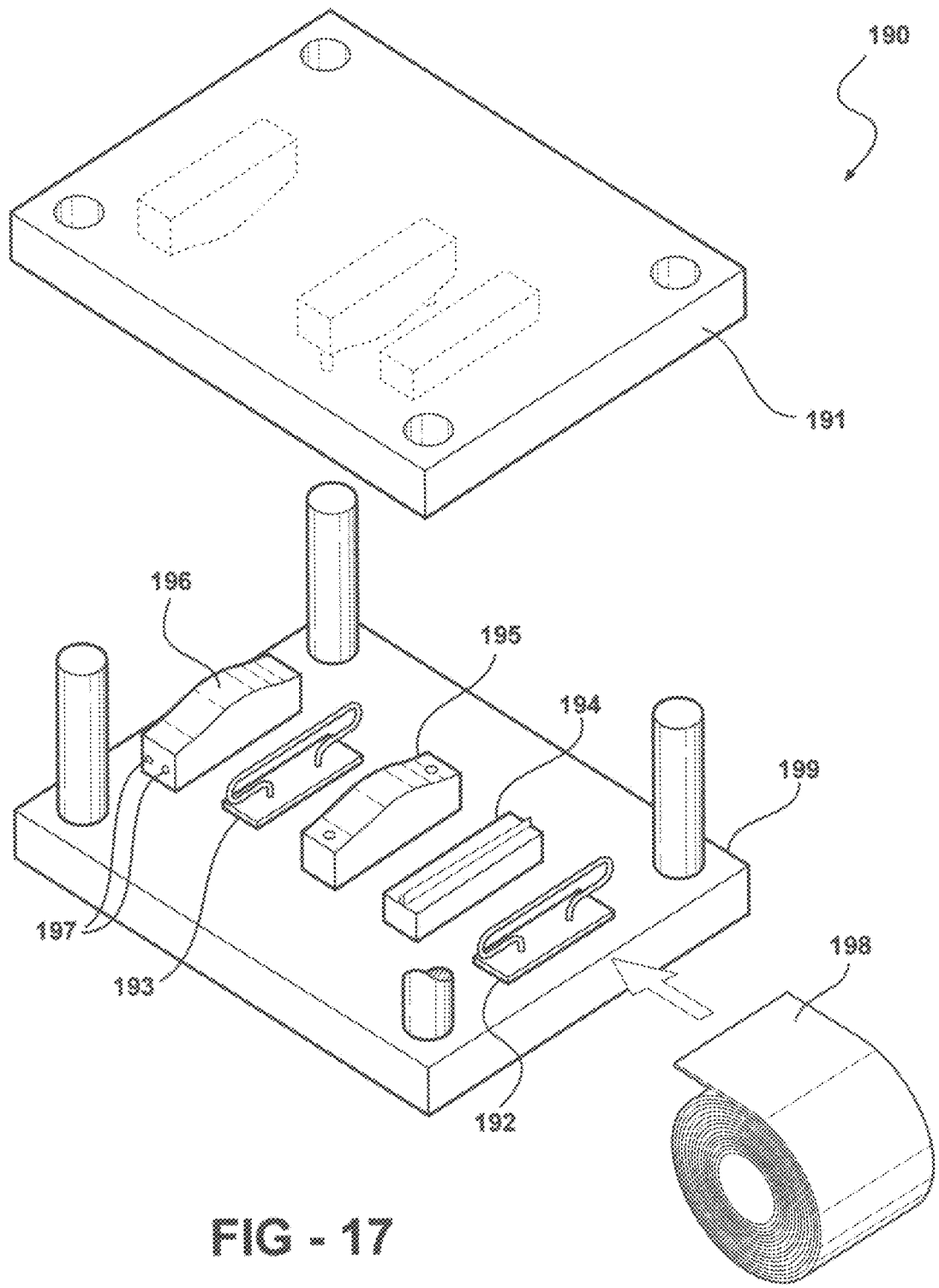
FIG. 17 is a view of an apparatus for heating and progressive die stamping a Colascite ferrous alloy in accordance with the second embodiment of the present invention.

FIG. 17 shows an apparatus known as a progressive die, generally denoted by the numeral 190 for making a near net shape parts from a steel strip in accordance with yet another aspect of the present invention. Upper half 191 of the progressive die complements lower forming half 199. Apparatus 190 includes an induction heating device 192 in which the workpiece passes through to heat, while avoiding, austenizing the material. The heater unit 192 may be controlled by a computer (not shown) to regulate the desirable heating. The workpiece is heated by induction heater 192 to a temperature which allows ease of metal shearing and forming, preferably about 540° C., before moving to trimming station(s) 194. Strip 198 moves from right to left as the freshly trimmed strip indexes to the first, of possibly multiple, forming stations 195.

Strip 198 is then indexed through an optional second induction heater 193 to maintain the sub-austenitic temperature of the strip. Strip 198 is then indexed to a final form station 196 to complete the pressure forming of the part to its final shape. This final form die, or separate cooling station, may be temperature controlled as to quench the part to a temperature at which further shape changing and springback will not occur. The final form die may accomplish this, either through air blast, water blast, or convection, etc. Cooling means 197 will have the ability to reduce the temperature of the final formed part to a temperature at which its shape will remain stable, usually below 315° C.

Although in this embodiment, the heating source is an induction heater and the quenching medium is a temperature controlled forming station, any suitable heating and quenching means may be used. This example will be recognized as a very simplistic example of a progressive die, to those skilled in the art. Many progressive dies have multiple trimming, forming, piercing, and other differently named stations. This example only illustrates the basics of progressive die forming opportunities and is not intended to limit the number of stations used to achieve a part or to prevent other commonly known processes used in progressive dies from being applied to this process.

Figure 18:
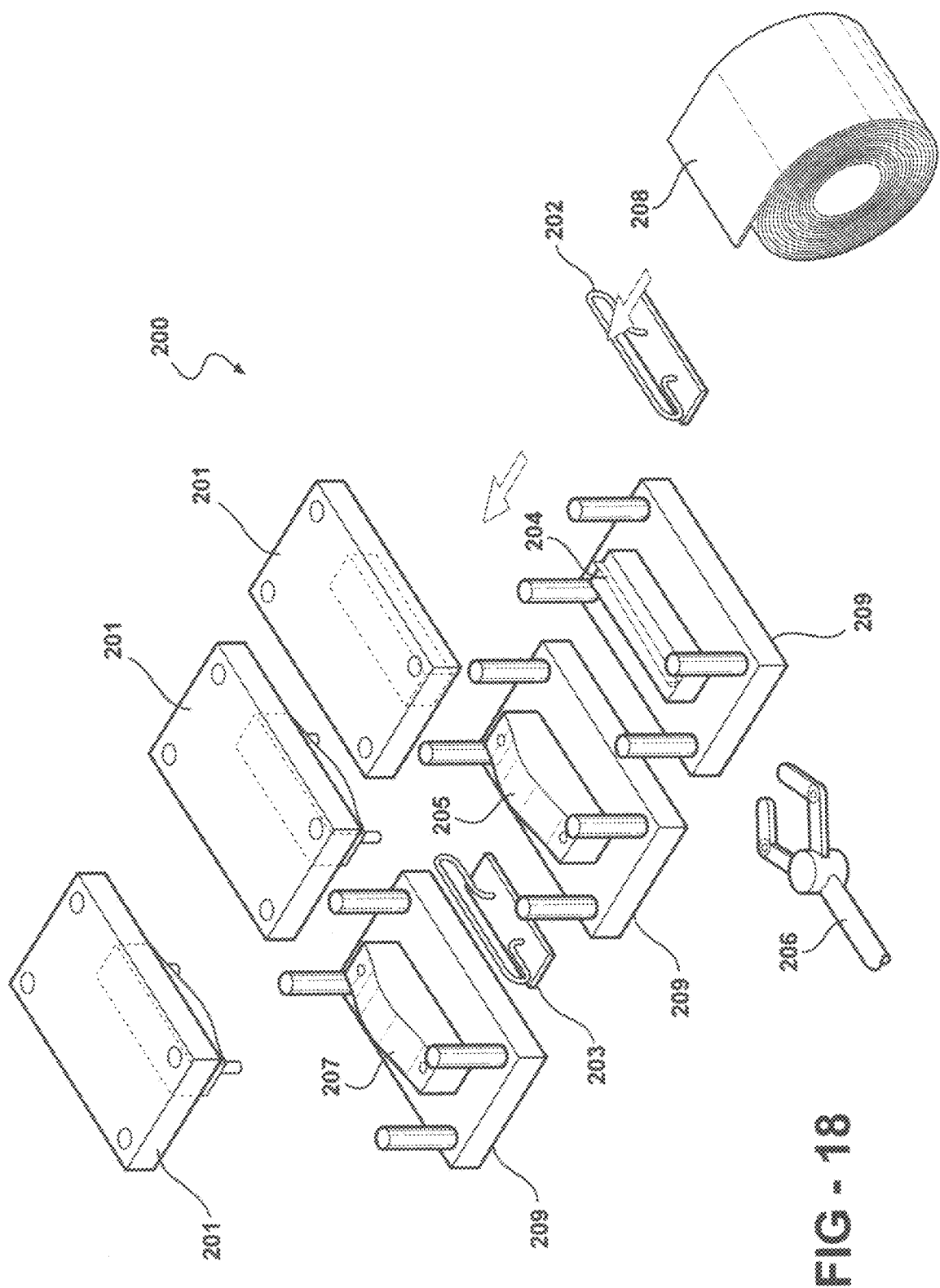
FIG. 18 is a view of an apparatus for heating and line die stamping a Colascite ferrous alloy in accordance with the second embodiment of the present invention.

FIG. 18 shows an apparatus known as a line die, generally denoted by the numeral 200 for making another near net shape part in accordance of the present invention. A line die is simply a sequence of individual dies organized in a press, or multiple presses, to act as a progressive die, albeit on individual die shoes. Workpiece 208 transfers from station to station as it may be on a strip, as in a progressive die, or as individual pieces that are mechanically transferred. Upper half 201 of the line die complements lower forming half 209. Apparatus 200 includes an induction heating device 202 in which the workpiece passes through to heat to a temperature below that which will austenize the material. Heater unit 202 may be controlled by a computer (not shown) to regulate the desirable heating.

Workpiece 208 is shown as a blank or strip, and is heated by an induction heater 202 to a temperature which allows ease of metal shearing and/or forming, preferably about 1000° F. before the first trimming/forming station(s) 204. Blank/strip 208 moves from right to left and indexes to the next, of possibly multiple, forming/trimming stations 205. Movement of individual blanks may be accomplished with mechanical assistance, such as that provided by robotics 206. Blank 208 may then indexed through an optional second induction heater 203 to maintain the sub-austenitic temperature of the blank. Blank 208 is then indexed to a final form station 207 which completes the pressure forming of the part to its final shape.

As in earlier aspects, this final form die, or separate cooling station, may be temperature controlled as to quench the part to a temperature at which further shape changing and springback will not occur. The final form die may accomplish this, either through an air blast, water blast, or convection. The cooling means will have the ability to reduce the temperature of the final formed part to a temperature at which its shape will remain stable, usually below 315° C.

Many line dies have multiple trimming, forming, piercing, and other differently named stations and this example only illustrates the basics of one line die forming unit, and is not intended to limit the number of stations used to achieve a part or to prevent other commonly known processes used in line dies from being applied to this Colascite forming process.

Figure 19:
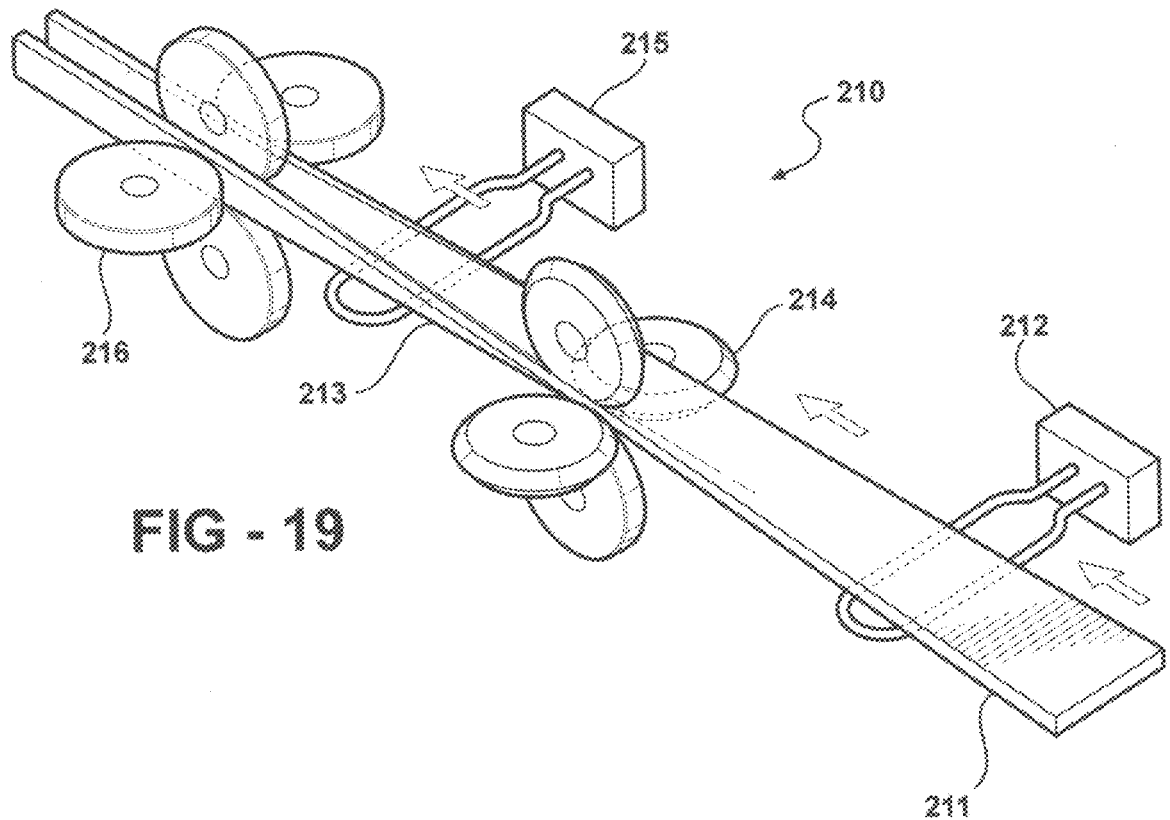
FIG. 19 is a view of an apparatus for heating and roll forming a Colascite ferrous alloy in accordance with the second embodiment of the present invention.

FIG. 19 shows still another die quenching unit as an apparatus known as a roll forming die, generally denoted by the numeral 210. Unlike progressive and line dies, in which a stamping press opens and closes to force the steel to change shape as it is pressurized, a roll forming die is a single station, or sequence of stations, of multiple forming members, usually wheels, which are organized linearly to change the shape of the steel as it is pulled through them. For this example, a flat sheet 211 of Colascite steel will be rolled into a "U" cross section. The rolling wheels of the forming die 214 restrain the steel from multiple directions as shown in the cross section.

Apparatus 210 includes an induction heating device 212 controlled by a computer (not shown) to regulate the heating to below the austenizing temperature. The workpiece is heated by the induction heater 212 to a temperature which allows ease of metal shearing and/or forming, preferably about 540° C. before the first rolling station 214. The workpiece blank may then be indexed through an optional second induction heater 215 to maintain the sub-austenitic temperature of the blank, and then indexed to a final form station 216 which completes the pressure forming of the part to its final shape. This final form die, or separate cooling station, may be temperature controlled as to quench the part to a temperature at which further shape changing and springback will not occur. The final form die may accomplish this, either through air blast, water blast, or convection.

The cooling means will have the ability to reduce the temperature of the final formed part to a temperature at which its shape will remain stable, usually below 315° C. Although in this embodiment, the heating source is induction and the quenching medium is a temperature controlled forming station, any suitable heating and quenching means may be used. This example will be recognized as a very simplistic example of a roll forming die, to those skilled in the art. Many roll forming dies have multiple trimming, forming, piercing, and other differently named stations. The intention of this example is only to illustrate the basics of roll forming die forming opportunities and is not intended to limit the number of stations used to achieve a part or to prevent other commonly known processes used in roll forming dies from being applied to this Colascite forming process.

Figure 20:
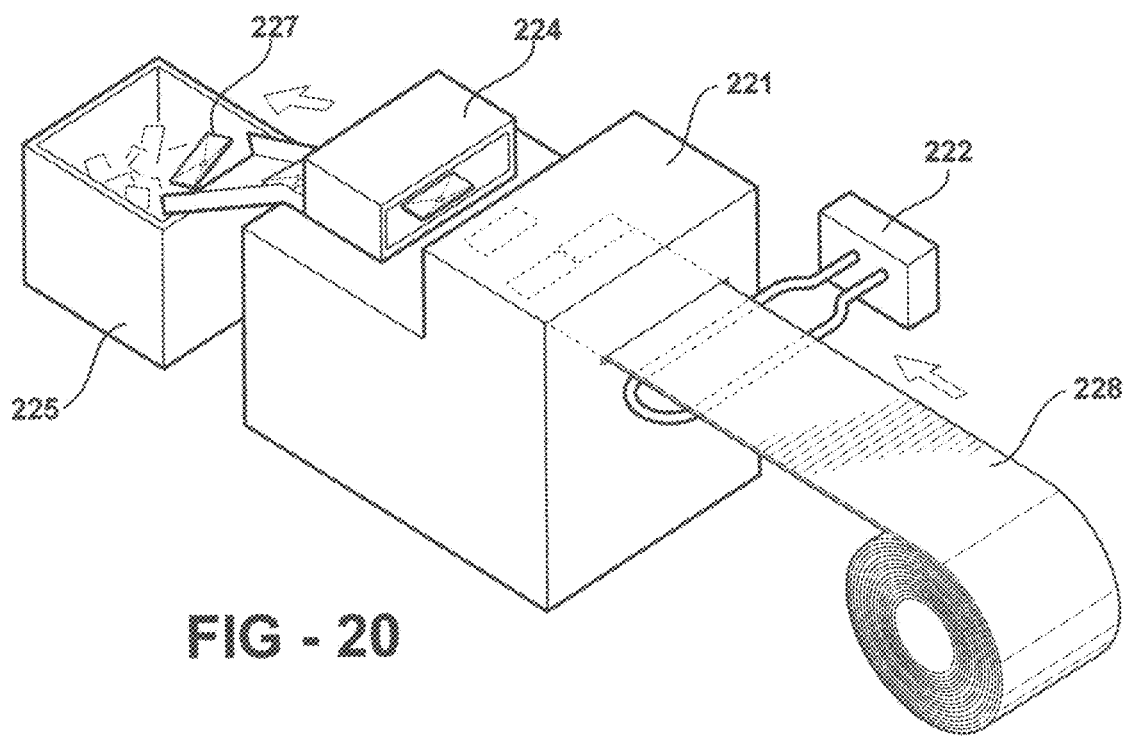
FIG. 20 is a view of an apparatus for heating and self contained conventional forming of a Colascite ferrous alloy in accordance with the second embodiment of the present invention.

FIG. 20 shows an apparatus known as a fourslide die, generally denoted by the numeral 220 for making a Colascite near net shape part in accordance of the present invention. A fourslide 221 is just one name given to a group of machines that can be set up to act like a multiple hit forming/trimming tool to make intricate small formed parts, capable of high volume production. The apparatus 220 includes an induction heating device 222 in order to heat but avoid austenizing the Colascite feed stock 228. The Colascite feed stock 228 may be a wire, strip, or other cross section a four slide will accept. The heater unit 222 may be controlled by a computer (not shown) to regulate the desirable heating. The workpiece is heated to a temperature which allows ease of metal shearing and/or forming, preferably about 540° C., by the induction heater 222, before the trimming/forming station(s).

The sub-austenized workpiece 228 feeds into the fourslide as multiple operations are performed on the workpiece until complete. The final form die 224, or separate cooling station, may be temperature controlled as to quench the part to a temperature at which further shape changing and springback will not occur. The final form die may accomplish this, either through air blast, water blast, or convection, etc.

The cooling means will have the ability to reduce the temperature of the final formed part to a temperature at which its shape will remain stable, usually below 315° C. The finished workpieces 227 will typically fall into a catch basket 225. Although in this embodiment, the heating source is induction and the quenching medium is a temperature controlled forming station, any suitable heating and quenching means may be used. This example will be recognized as a very simplistic example of a fourslide die, to those skilled in the art. Many "fourslide style" dies have multiple trimming, forming, piercing, and other differently named stations. The intention of this example is only to illustrate the basic opportunities of self contained die forming opportunities, a fourslide die being just one example of the numerous and variedly named machines that perform similarly. It is not intended to limit the type of self contained forming mechanisms covered by this embodiment or to prevent other commonly known processes used in self contained dies from being applied to this Colascite forming process.

Figure 21:
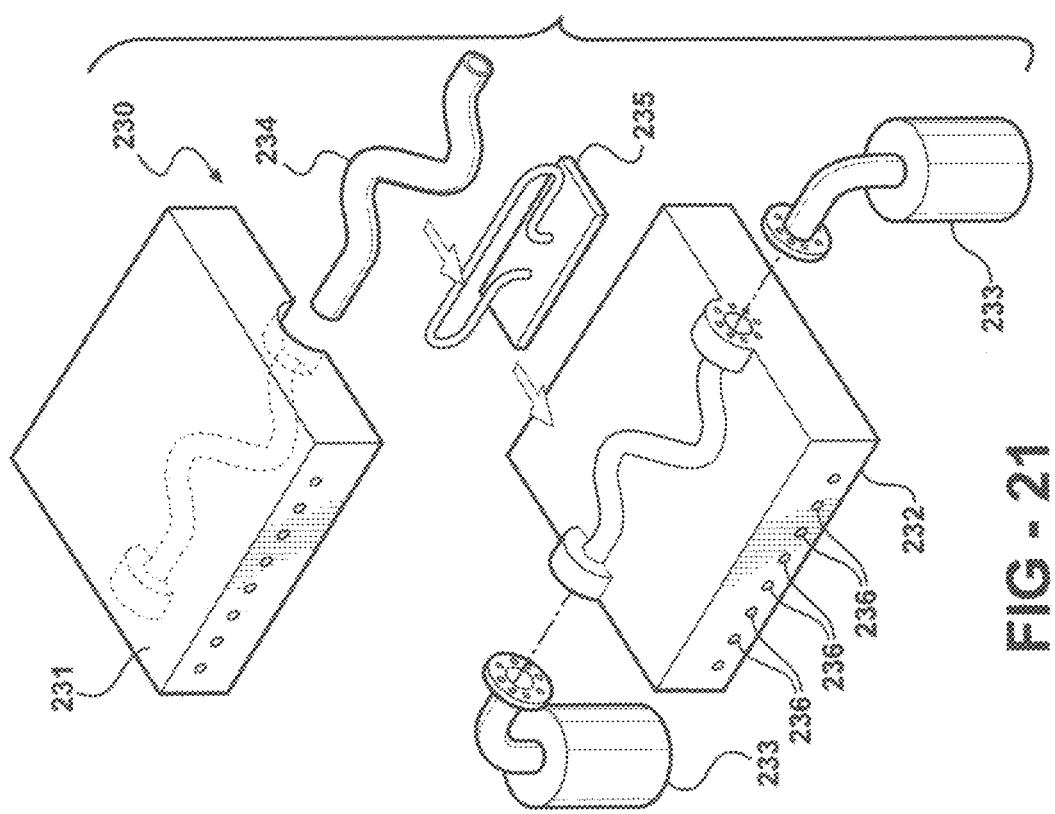
FIG. 21 is a view of an apparatus for heating and expansion hydroforming a Colascite ferrous alloy in accordance with the second embodiment of the present invention.

FIG. 21 shows an apparatus known as expansion hydroforming, generally denoted by the numeral 230 for making a Colascite near net shape part in accordance of the present invention. An expansion hydroform die consists of an upper die half 231 and lower die half 232 that accepts a Colascite steel tube 234, with openings at both ends of the tube.

Hydraulic fittings are clamped to the one half of the die, or the workpiece itself, to cover the two end openings (lower illustrated). When the die is closed, hydraulic pressure from a hydraulic pump mechanism 233 imparted into the inner wall of the tube 234 forces the tube to stretch until it contacts the cavity walls of the upper and lower die halves.

The apparatus 230 includes an induction heating device 235 in which the tube passes through to heat but avoid austenizing the material. The heater unit 235 may be controlled by a computer (not shown) to regulate the desired heating. In most cases, the workpiece 234 is rough formed to approximate shape of the die cavities. The workpiece 234 is heated to a temperature which allows ease of metal forming and/or trimming, preferably about 540° C., by the induction heater 235, before the part is placed in the die 232. Alternately the workpiece 234 could be heated to forming temperature by temperature controlled fluid from the hydraulic pressure unit 233 while it is in the closed die. The die may be temperature controlled 236 as to convection quench the part to a temperature at which further shape changing and springback will not occur.

The cooling means 236 will have the ability to reduce the temperature of the final formed part 234 to a temperature at which its shape will remain stable, usually below 315° C. Although in this embodiment, the heating source is induction or heated fluid convection, any suitable heating means may be used. This example will be recognized as a very simplistic example of an expansion hydroform die to those skilled in the art. It should be noted that many expansion hydroform dies can pierce the finished formed part. The intention of this example is only to illustrate the basics of expansion hydroform die forming opportunities and is not intended to limit or prevent other commonly known processes used in expansion hydroform dies from being applied to this Colascite forming process.

Figure 22:
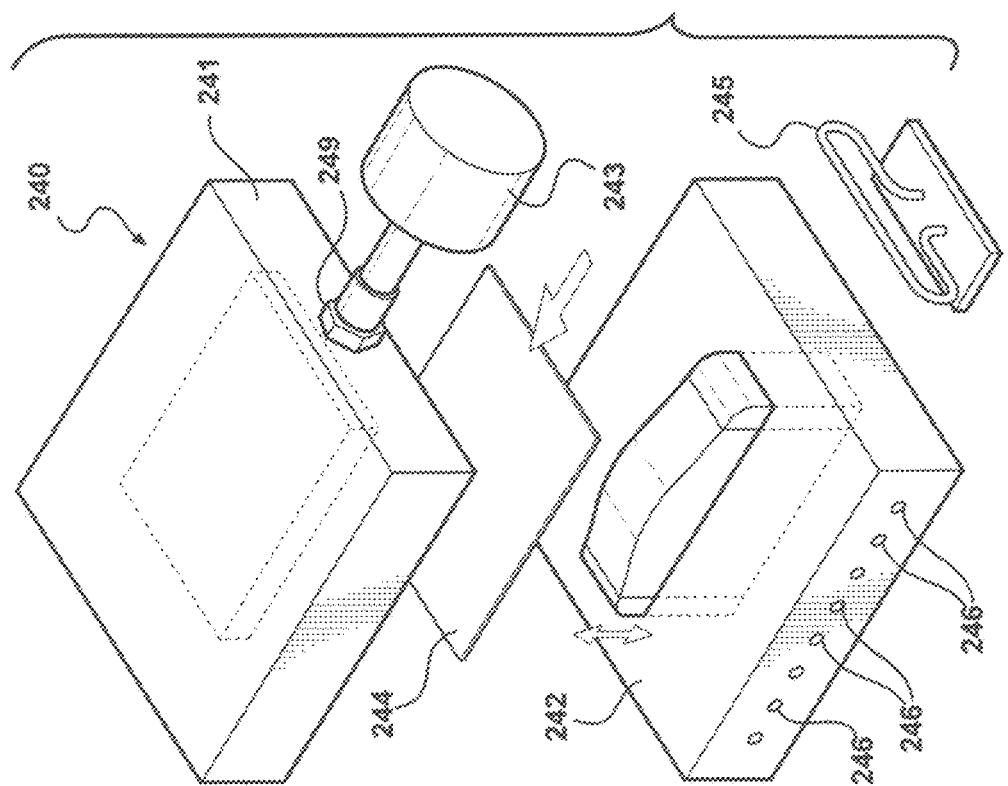
FIG. 22 is a view of an apparatus for heating and bladder hydroforming a Colascite ferrous alloy in accordance with the second embodiment of the present invention.

FIG. 22 shows an apparatus known as bladder hydroforming, generally denoted by the numeral 240 for making a Colascite near net shape part in accordance of the present invention. A bladder hydroform die consists of an upper die half 241 of the hydraulic bladder and a complementary male shaped punch/ring lower die half 242 that accepts a Colascite workpiece. Hydraulic fittings 249 are clamped to the upper die half 241. When the die is closed, hydraulic pressure from a hydraulic pump mechanism 243 imparted into the upper half bladder 241 applies force to the workpiece as it is stretched by the lower punch die half 242. The bladder's purpose is to apply equalized force as the punch stretches the Colascite steel.

Apparatus 240 includes an induction heating device 245 in which the workpiece passes through, avoiding austenizing the material. The heater unit 245 may be controlled by a computer (not shown) to regulate the desirable heating. The workpiece 244 is heated by the induction heater 245 to a temperature which allows ease of metal forming and/or trimming, preferably about 540° C., before the part is placed on the die 242. The die may be temperature controlled 246 as to convection quench the part to a temperature at which further shape changing and springback will not occur.

Cooling means 246 will have the ability to reduce the temperature of the final formed part 244 to a temperature at which its shape will remain stable, usually below 315° C. Although in this embodiment, the heating source is induction, any suitable heating means may be used. This example will be recognized as a very simplistic example of a bladder hydroform die to those skilled in the art. The intention of this example is only to illustrate the basics of bladder hydroform die forming opportunities and is not intended to limit or prevent other commonly known processes used in bladder hydroform dies from being applied to this Colascite forming process.

Figure 23:
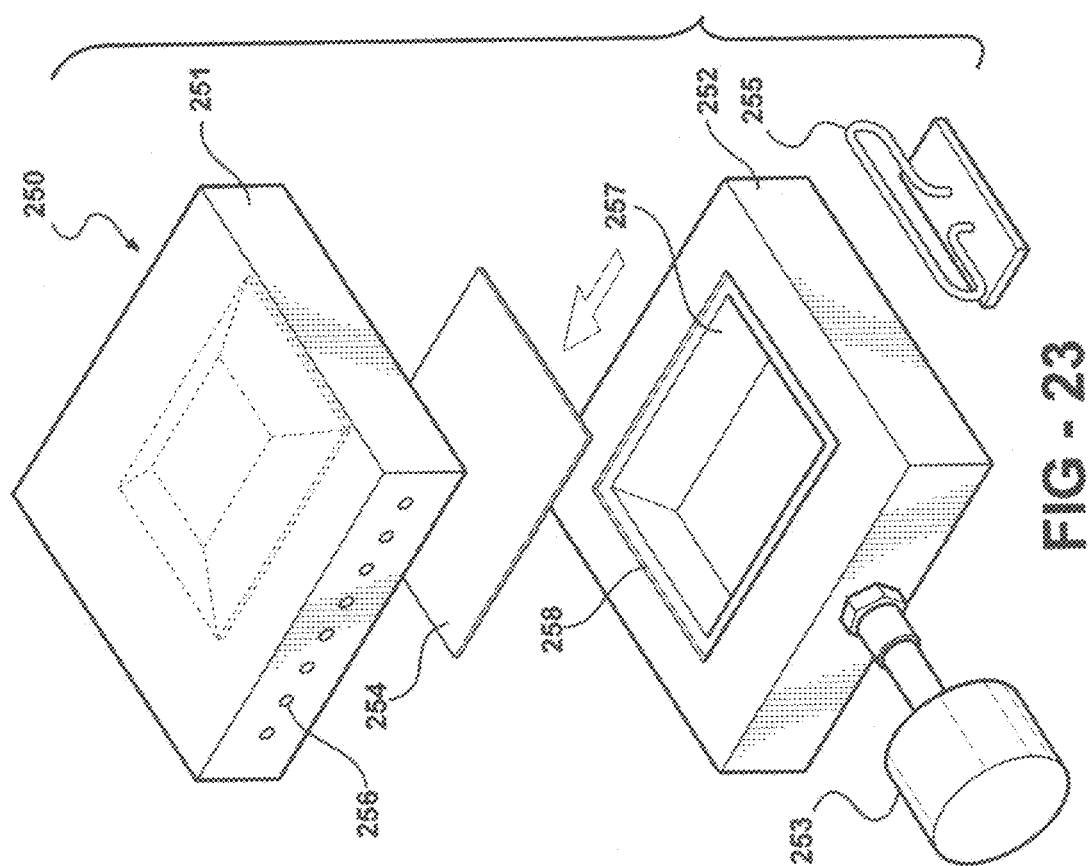
FIG. 23 is a view of an apparatus for heating and liquid punch hydroforming a Colascite ferrous alloy in accordance with the first and second embodiments of the present invention.

FIG. 23 shows an apparatus for liquid punch hydroforming, generally denoted by the numeral 250 for making a Colascite near net shape part in accordance of the present invention. A liquid punch hydroform die consists of an upper die half 251 and a complementary lower die half 252 that accepts a Colascite sheet 254. Lower die half 252 shows only a representation of the finished part's outer edge 258. Within this edge area is a hydraulic fluid flow cavity 257. Lower die half 252 has a hydraulic fluid pressure fitting through which fluid will flow. When the die is closed, upper die half 251 seals against the finished edge representation on the lower die half 252. Hydraulic pressure from a hydraulic pump mechanism 253 imparted into the fluid flow cavity forces the sheet to stretch until it contacts the cavity walls of upper die half 251.

Apparatus 250 includes an induction heating device 255 in which the sheet passes through to heat, while not yet austenizing the material. Heater unit 255 may be controlled by a computer (not shown) to regulate the desirable heating. In the spirit of the second embodiment, the Colascite workpiece 254 is heated to a temperature which allows ease of metal forming and/or trimming, preferably about 540° C., by the induction heater 255, before the part is placed on lower die 252. Alternately the workpiece 254 could be heated to about 540° C. by temperature controlled fluid from the hydraulic pressure unit 253 while it is in the closed die. Upper die half 251 may be temperature controlled as to convection quench the part to a temperature at which further shape changing and springback will not occur, usually below 315° C.

In the spirit of the first embodiment, the non-Colascite workpiece is either heated by induction to about 900° C. to 1290° C. and placed on the lower die 252 or the temperature controlled fluid from the hydraulic pressure unit 253 rapidly heats the workpiece to about 900° C. to 1290° C. when the workpiece is placed in the closing die. The heated non-Colascite material is stretched by the heated hydraulic fluid until it contacts the temperature controlled upper die. The upper die quenches the non-Colascite steel to form the Colascite microstructure. Cooling means 256 reduces the temperature of the final formed part 254 to a temperature at which its shape will remain stable, usually below 315° C. Again, although in this embodiment, the heating source is induction or heated fluid convection, any suitable heating means may be used. This example will be recognized as a very simplistic example of a liquid punch hydroform die to those skilled in the art.

Figure 24:
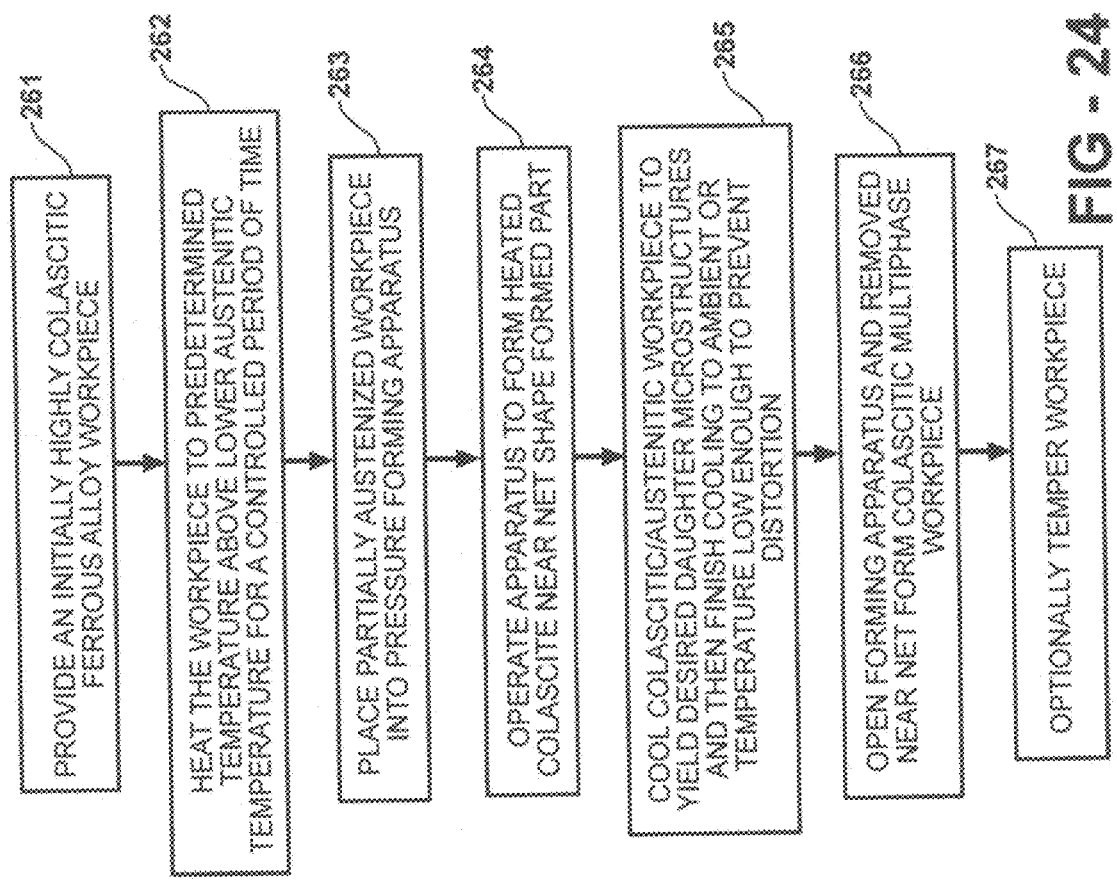
FIG. 24 is a flowchart of a process of making a Colascite article in accordance with the third embodiment of the present invention.

FIG. 24 shows a third embodiment with all aspects of the second embodiment (see FIG. 16 through FIG. 23) but one. In some instances, an exception to sub-austenitic processing may exist. It may be desirable to surpass the lower austenitic conversion temperature for a predetermined time frame, to a predetermined temperature, in order to allow a specific percentage of daughter phase microstructure to re-convert to parent austenite. This parent austenite may then be processed into different daughter microstructures that would yield properties dissimilar to the prior daughter phases still present in the sheet. To not be repetitive, a restatement will not be made of all of the statements and techniques of pressure metal forming described for the second embodiment (see FIG. 16 through FIG. 23), but will say that the resulting microstructures from the second embodiment described will work for the third embodiment with a modification to A2 austenitic temperature range processing, which is commonly between 723° C. and 900° C. for many steel alloys.

The third embodiment of the present invention discloses a method of making high percentage Colascite multiphase ferrous alloy near net shape parts and an apparatus of making the same. As shown in FIG. 24, the process of making Colascite multiphase ferrous alloy near net shape part includes providing an initially Colascite ferrous alloy workpiece 261, heating the workpiece to surpass the lower austenitic conversion temperature to a predetermined temperature 262, placing the partially austenized workpiece of ferrous alloy in the pressure forming apparatus 263, and applying forming pressure to form a near net shaped part from the partially austenized Colascite sheet 264. The next step offers a multitude of options to create different daughter microstructures from the austenized portion of the workpiece. Cooling from austenite through hard quenching, quenching and tempering, quenching and partitioning, air knife cooling, slow cooling, etc. and many other methods known to those skilled in the art will yield a tempered Colascite multiphase material.

Upon the workpiece reaching ambient temperature, or some other determined temperature cool enough to complete microstructural transformation and to prevent distortion of the part 265, the die is opened and the near net shaped Colascite multiphase pressure formed workpiece 266 is removed. A step of tempering 267 may be optionally later included to relieve stresses and prevent cracking of the resulting workpiece. The temperature that the initially Colascitic sheet is heated to is that which affords enough ductility to properly form the part without tearing or otherwise distorting the sheet and damaging the resulting part. This temperature is most often between 723° C. and 850° C., but may deviate from this based on the chemical composition of the ferrous alloy being processed.

FIG. 25 is a temperature vs. time diagram illustrating the change of temperature during the heating and optional quenching steps for processing a workpiece of Colascite ferrous alloy. The graph of FIG. 25 plots time along the horizontal axis and temperature along the vertical axis. At the beginning of the process, the workpiece is at ambient temperature, normal room temperature encountered in the workplace. In any instance, an ambient temperature is a temperature that is sufficiently low so that significant metallurgical transitions will not occur in the workpiece. Typically, ambient temperatures are below about 50° C.

For illustrative purposes, the ferrous alloy workpiece is heated to follow a temperature gradient curve, generally indicated by the numeral 270. The temperature of the workpiece is increased on the positively sloped side 272 of the curve to a temperature of from about 315° C. to about 850° C., held above the lower austenitic conversion temperature for a predetermined timeframe 276, and then reducing its temperature on the negatively sloped side 274 of the curve back to ambient at a rate of from about 1° C./sec to about 5,000° F./sec. The preferred heating and cooling plateaus are ferrous alloy specific. The most important characteristic of the curve is to decompose the designed amount of daughter microstructure back into parent austenite before creating new daughter microstructures to yield a new Colascite multiphase workpiece.

For example, a sheet of Colascite ferrous alloy may be heated to a temperature of about 760° C., held at 760° C. for enough time to return 20% of the microstructure to austenite, loaded into the car door panel forming die, the die subsequently closed to form a near net shape car door panel, and then optionally quenched back to ambient temperature by the cooling process of the chilled die itself. Reducing the temperature to a level at which the steel is less pliable is desirable to prevent the mechanism that removes the car door panel from the die from causing damage to the near net shape panel of 20% martensite in an 80% Colascite matrix.

FIG. 26 represents a fourth embodiment of the present invention and is an expansion of the second and third embodiments. Although most of the previous embodiments discuss heating the workpiece in the vicinity of, but outside of, the exact pressure forming area through induction or heating heads, the unformed Colascite workpiece could also be heated in an environmentally controlled pressure forming general area. Without restating each embodiment mentioned above, each embodiment could be constructed in an elevated temperature, atmospherically controlled work envelope. Pressure forming apparatus would be constructed of materials suited to operating in an elevated temperature environment. Through this embodiment, workpiece cooling, to the open environment, would not be detrimental to the process and proper forming temperatures would be maintained at all times.

For example, the second embodiment of a progressive stamping die apparatus 280 could be designed with an insulated containment 282 on its four vertical sides. The part could be heated by the initial induction heater, passed through and processed in an environmentally controlled elevated temperature die, and then cooled upon exiting the finish part side of the tool. The insulated containment panels could be affixed to the lower half of the progressive die 284. The upper half 286 of the progressive die would traverse up and down maintaining a thermal barrier with the insulation that is affixed to the lower die half 284. The workpiece 283 entering the insulation enclosure would have a slot 288 to receive the incoming Colascite workpiece. The insulation, through flexible contact, would be arranged as to prevent as much heat transfer out of the insulated environment as possible. The finished part 289 would exit the progressive die through a "trap door style" slot 287 that would open as the workpiece indexes. Heating of the insulated environment could be done in a variety of methods, all aforementioned in prior embodiments of this application.

Although in these embodiments, the heating source is either propane or induction and the quenching medium is a temperature controlled forming station, air knives, water, etc., any suitable heating and quenching means may be used. It should be noted that, based on the particular iron based alloy used, there is a corresponding time between the applied heating and subsequent quench to prevent part distortion. It should also be noted that particular Colascite alloys may be better served by being initially quenched to higher temperature than a water mechanism will allow and then allowed to cool to room temperature by other means. The water cooling of the dies may also be substituted by heating oils in order to maintain the dies at a certain temperature and the part not even cooled until after it exits the die.

This heating for any of the above embodiments can be accomplished by any suitable means known in the art. For example, heating may be carried out in a fluidized bed, electric furnace, plasma furnace, microwave oven, or by an electric resistance heater, open environment propane forges, gas fired means, solid fuels, and torches. Other heating processes such as inductive heating, flame heating, radiant energy heating and the like may also be employed in the practice of the present invention. In some instances, it may be advantageous to measure the temperature of the workpiece during the heating step, and temperature information obtained thereby may be utilized to control the input of heat and/or parameters of the quench medium such as temperature, velocity, pressure and the like as appropriate, to allow for accurate temperature control. Such control may be carried out in a feedback mode or in an indirect mode.

This die cooling quench medium may comprise a simple fluid such as water, brine solutions, or other water-based liquids, oil or the like. In any instance, the quench medium needs to be at a lower temperature than the heating temperature. The quenching medium is regulated so that the work piece can be cooled down to the ambient temperature within seconds or longer as desired, based on the required characteristics of the given Colascite iron based alloy.

Various heaters can be used to heat the Colascite ferrous alloys. The heater may be stationary or movable with respect to the stamping die. An example of stationary heaters is shown in FIG. 16. The heater including multi-nozzle heating heads provides variable heating temperature, possibly to different temperatures in different areas of the panel to be formed. The computer control of the heater may control the heating location on the ferrous alloys. For a specific location where it is desired to form more easily in the die, the heater may concentrate the heating power on the chosen location.

The articles made by the method of the present invention have many applications. In general, any pressure formed iron based article that would benefit from a Colascitic microstructure is a candidate to consider. It should be noted that some iron based alloy high strength near net shaped parts may require multiple operations to achieve final form.

A least one first hot forming process in accordance with the present invention almost instantaneously creates a Colascite microstructure upon quenching. The second set of pressure forming embodiments of this process is dissimilar to prior hot forming processes because it is the only hot forming process that is specifically designed to work with a pre-existing Colascite microstructure steel. Furthermore, it is the first hot forming process in which the ultra high strength of the steel microstructure maintains approximately 65% of its as quenched strength after multiple thermal cycles to 540° C. which makes the steel more ductile and easier to form.

Moreover, it is thought that this is the first hot forming process in which the steel can be continually reheated to form again and again, without significantly degrading strength. Reheating may be necessary for forming processes in progressive dies, line dies, flanging dies, small part making fourslide dies, etc. The second embodiment is a unique hot forming process in which the formation of austenite is specifically avoided, not intentionally passed to make another daughter microstructure upon quenching, such as in die quenching technology which makes an untempered martensitic structure. The third embodiment is a process in which high strength Colascite may be slightly degraded by intentionally passing the lower austenitic conversion temperature to gain a specific percentage of non-Colascite microstructure thereby forming a dual or tri phase Colascite material with subsequent cooling and/or quenching.

Another interesting aspect of this invention's embodiments is that an instant heat tempering process, of approximately 315° C. to approximately 720° C., that is subsequently water quenched, causes more Colascite to nucleate in the iron based alloy workpiece. Heating may be done by propane/oxygen flames, induction, microwave, or any other previously mentioned heating methods known to those skilled in the art. Quenching may be done by water, oil, aqueous solutions or any other methods that produce the required temperature drop in the Colascite workpiece.

Partial and Full Colascite Transformation

In the course of studying the photomicrographs taken of the material which has been produced by the previously described microtreatment process of the present invention, it has been noted that the iron-based alloy has various sections, grain boundaries and microstructures which indicate formation of various materials made by this new process. The materials included in the photos show Colascite, bainite-like, martensite-like, acicular ferrite-like, austenite-like, and other unknown materials, along with combinations of the above.

These partially and fully transformed Colascitic portions may include conversion of between 1 and 99 percent by volume of the material into Colascite, while the remaining material may be a combination of other materials including martensite, austenite and combinations of those materials all together. Such materials generally tend to have more than half Colascite after following the process, but sometimes it is over 90% and sometimes it is less then 10%, depending on how much of the area was treated.

A stamped out car door panel in which the areas around the A and B pillars and the exterior edges are desired to be transformed into Colascite, while leaving the steel door in its original form of untreated stamped coiled steel for other desirable properties, is possible with the present invention. Therefore, the portions of the door panel that would be treated, to yield a piece that had maybe as much as 5% of the area transformed into Colascite. On a more microscopic level, the edge that was treated would be nearly all Colascite, depending on how diligent the processor was in heating and quenching immediately.

It must also be understood by other material scientists that when it is stated that "partially and/or fully transformed to Colascite" it is meant that at least portions of the article being treated convert or are transformed to Colascite, which leaves untreated materials in their untreated state, and also means that incomplete treatments create different microstructures and materials, while sometimes it is desirable to have only partially transformed Colascite, such as with the case of the car door panel described hereinabove.

Temperature Control

In accordance with the above, the present invention has been practiced with many variations, especially those in the areas of temperature control and various transformations have occurred, when following the process of the present invention. Temperature control is an important aspect of this invention and such control is important to the formation of various partially and fully transformed Colascitic portions of iron-based alloys. For example, many samples of steel that have been raised to 1050° C. to 1320° C. generally have been yielding 90% Colascite, while raising the temperature to 980° C. is yielding about 75% Colascite. This invention may still be practiced over 1370° C. to just below the melting point of the steel being utilized. Of course, different steel alloys require slight experimentation in order to achieve the desired amount of Colascite. Of course, because every single possible steel cannot be listed that is available to mankind, description is needed of the temperature control situation for each of those examples.

The temperature of the subject alloy is rapidly raised to a temperature above the austenitic temperature of the material, and then immediately quenched in order to achieve Colascite, coalesced bainite, bainite, or various versions of martensite. Various professors and metallurgists differ on their impressions as to the microstructure achieved by the present process, and it is reluctantly stated that it is always bainite or martensite that is being formed, hence Colascite is the name given until the experts determine exactly what to call it.

Looking now to FIG. 27, it can be seen that a sample of AISI 8620 steel was converted to what appears to be Colascite by this processing of rapidly heating to a temperature above the austenizing temperature, i.e. 1290° C., and immediately quenching within fractions of a second to form a predominantly bainite structure. FIG. 27 shows the predominantly Colascitic structure. FIG. 28 shows the identical steel, AISI 8620, austempered in molten salt for 15 minutes. Clearly, the microstructure formed by that traditional process does not bear any resemblance to the Colascite of FIG. 27.

Yet, when viewing FIG. 29, an AISI 8620 material having cobalt and aluminum alloyed therein to increase bainitic transformation was provided as the starting material, molten salt was used to quench the austempered portion, yielding a resulting microstructure which reveals white areas which appear to be retained austenite and "classical bainite".

The starting material, may be of any cross section, including wire, rolled coiled steel, stamped pieces, of any thickness that can be heated and quenched in a relatively short period of time. The present process works to form new microstructures. The process works especially well with materials that are from about 0.001" to 0.5" cross sections, including wires, strip steel, and the like, as they are easy to heat and quench. With appropriate rapid heating means, thick sections in excess of 1" to 2" can be obtained.

The temperature may be raised on the material to a temperature above the austenitic conversion temperature, but especially between 900° C. and 1370° C. in any manner which allows the steel to be handleable, i.e. so that it is not melting and can still be handled. However, the quench rate must be between 500° C. per second to about 6,000° C. per second, i.e. the temperature of the steel is generally in the neighborhood of 900° C. to 1370° C. and must be quenched immediately to sub-austenitic, preferably room, temperature. Studies done with boiling water as a quenchant have shown Colascite to be formed in the resulting steel leading to the belief that slack quenching may not be detrimental to Colascite formation. Whereas many other material properties suffer from a slack quench of hot water, Colascite forms regardless.

The rate of heating may be at any rate, such that the steel may be preheated in a large oven in a coil an then boost heated at the very end at a rate of 500° C. per second as it passes between the heater units, only to be quenched immediately thereafter within three seconds to room temperature.

The method of heating and quenching is optimally suited to every practice of the invention, such that the heating may be effected by gas torches, infrared, conduction, or any of the methods described in the above mentioned provisional patent applications, but may also include heating with high temperature rollers, as well as quenching with very low temperature rollers made of alloys that can resist such temperatures and also that can impart thermal transport at a very quick rate. Heat dissipation materials may be used for the quenching rollers, and such rollers may include materials such as various heat dissipative ceramics, i.e. silicon nitride, and/or any other heat transfer material that will immediately remove heat from the steel. While the quenching rate is dramatic, materials suitable for chilling with the rollers may mean that the exterior body of a particular roller that comes in contact with the heated steel or other heated iron-based alloy being microtreated, must be able to remove heat at the rates described above.

Furthermore, preheating under the austenitic temperature may be advantageous to get the materials into a high temperature state, where elemental migration can begin, but at a sufficiently low temperature i.e. between 200° C. and 650° C., as the material should not austenitize prematurely. In addition, in order to avoid de-carburizing under 1200° C., it is best for an operator to select relatively quick heating and quenching times because the treatment is not occurring for long enough at a particular temperature point to allow the carbon to escape.

The optional preheating step may be used to bring the material up to 200° C. to 650° C., and then given a "boost heat" immediately prior to quenching. The method of adding the additional "boost heat" may be the same preferred gas or propane torches described in the various other provisional patent applications. Such torches may be constructed with torch orifices or blowtorch heads, directed toward the steel to be microtreated. By staggering the blowtorch heads, for example, in the case of rolling strip steel, one side of the opposing panels of blowtorch heads could have an odd number of heating points, while the opposite side would have an even number such that they are staggered in between each other, so that, in the instance where one of the torch heads became clogged or was otherwise non-ignited, the remaining heads would sufficiently carry the day in order to achieve the goal of microtreatment.

Feed Rate

In accordance with yet another one of the embodiments of the present invention, where tensioning rollers may be utilized along with a continuous roll of wire or strip steel, the feed rate of the continuous material is a factor in the heating and quenching rate that is usable for the invention. For example, a 75 mm wide strip steel is generally heated by a bank of a multiplicity of torch heads and immediately thereafter, i.e. within several inches of the heating bank, the strip steel comes into contact with a cooled water chill quench bucket configuration that has a slit in the bottom of the bucket surrounded by rubber seals in order to minimize loss of the cool water that is used for quenching. The feed rate may be from about 25 mm per hour to about two kilometers per minute, depending on how fast the heaters are able to heat the steel and how quickly the water quench bucket can be used to cool the heated steel immediately after the heating has taken place. The strip steel mentioned above may be rapidly moved through the tensioning rollers either horizontally, vertically or at any angle that may be preferential. The feed rate is easily calculated by the ability of the heaters to heat whatever subject iron-based alloy is being microtreated.

Feed rates will differ for microtreating continuous materials other than steel, as this invention may be utilized for any metallic alloy in order to perform a phase transformation, from untreated to treated. The present inventors envision that any material capable of withstanding a heat treatment followed by an immediate quenching is a candidate for phase transformation by the method of the present invention.

For instance, a 75 mm wide strip steel can be fed through the blowtorch heater bank and water quenched at a rate from about 25 mm per hour to about 2 meters per second. The heating block which is used in this "flash processing" procedure is preferably located approximately 10 to 250 mm above or beside the water quench station so that immediate quenching may be effected. As feed rate increases, so too may the preferred distance between rapid heating and subsequent quenching. Some materials may need an alloy dependent prescribed amount of time at an elevated temperature to "prepare" for transformation to the desired microstructure.

It is anticipated that ultimately the present invention may be practiced at a feed rate of up to one mile per minute in order to treat steel as it passes therethrough. If the subject steel is thicker, the heating step will take longer, and the feed rate will be consequently lengthier.

Alloying Components

Alloying of the stock feed material, i.e. the iron-based alloy, can create different effects after quenching. Certain components may be added for thermal transport such as cobalt, aluminum, helium, nitrogen, hydrogen, and other known thermal transport components, which will allow a thicker material to be microtreated because the heating rate will be increased, and the quenching rate will be increased. For the cobalt component, it is preferable to have less than or equal to 1.5% by weight, aluminum preferably less than or equal to 1.0% by weight, and the hydrogen, helium and nitrogen components may be incorporated as metal hydrides by infiltrating the metallic microstructure matrix with hydrogen gas, helium gas and/or nitrogen gas. Any combination of these thermal transport components is also envisioned by the present invention and may act to provide microstructure transport mechanism through grain boundaries and through the bulk of the material.

The materials that are formed by the present invention appear to be combinations of Colascite possibly comprised of upper bainite, lower bainite, coalesced bainite, martensite and combinations of the above. Upper and lower bainite is commonly and conventionally formed by austempering to lower and higher temperatures, respectively, on the order of from about 220° C. to 360° C. for lower bainite and 360° C. to 550° C. for upper bainite, each steel alloy having its own determined temperature ranges. Coalesced bainite is formed when the platelets of bainite that are created simultaneously in parallel orientation, merge together to form coalesced materials that are larger pieces of bainite.

In order to control and reduce the coalesced bainite concentration, it another aspect of the invention incorporates alloying with new materials to control the amount of the different types of possible bainite component. The present invention has been shown, on numerous occasions using the examples shown hereinbelow, to provide a much higher concentration of particularly desired bainite-like material. Alloying, such as keeping the carbon concentration at a lower weight percentage value, has been found to reduce or prevent coalescing, which may also act to process out the coalesced bainite. In order to further decrease or prevent coalescing, the present invention envisions adjustments of the heating and quenching temperatures, and adjusting the feed rate and draw rate of the coiled or strip steel or steel wire as it is received through the heating element and the quenching station. In addition, in the embodiment utilizing the tensioning situation with the feed rate and draw rate at variable rates, it has been found that the more one stretches the sample, the more aligned the platelets become, giving more chance for coalescing to occur. Initial experiments indicate that greater stretching of the steel between the tensioning rollers tends to produce more coalescing, which is less desirable.

Rapidly heating to a high temperature then immediately quenching back down to room temperature within milliseconds, revealed that it is also possible to put a surface effect onto a bulk material, whereby a Colascitic skin could be put on the outside of a steel core piece. For example, a 6.5 mm plate of AISI8620 steel could be briefly heated and immediately quenched in a manner such that only an outer skin or layer of the Colascite, or whatever material it is that the present invention is providing, is formed. Furthermore, spots or regions of this new high strength material could be formed across the surface of core piece of steel, such that a pattern of Colascite could be formed as a surface effect of a relatively thick piece of steel. The heating of the surface could be performed by the propane or gas torch as previously described in reference to the provisional patent applications already on file, such that a desired pattern could be treated onto the surface of a large piece of untreated steel.

For instance, a 6.5 mm thick piece of steel which is 1.3 meters wide and 2.5 meters tall could be used for architectural components and building supplies, wherein it might be desired to have an extremely strong portion for mounting to the sides of a skyscraper. In that regard, the 1.3×2.5 meters sheet of metal could be run through a microtreatment process whereby only the edges and the center of the 6.5 mm steel plate would be heated and followed by an immediate quench in order to form Colascite, or some other very strong material only in the places that it was heated. Therefore, the steel plate would remain untreated in the portion that was not heated and not quenched. This may be necessary for mounting, or to provide resistance to bending in certain parts of a building where a steels flexural modulus was needed to keep the building standing in the event of an earthquake.

The layers of Colascite, or other formed hard materials of the present invention, can be calculated to a particular depth by determining how long it would take to heat to a particular layered depth that was desired, and thereafter immediately quenching with water in order to provide a toughened steel. Furthermore, it may be discovered that a layer across the entire surface of an architectural steel component may be desired in order to resist earthquake and/or tornado, etc. individually described by category.

FIG. 30 illustrates an embodiment of the present invention as it relates to the processing of hollow tubes, like those used for flagpoles and pipe. Only one side of the material of the iron base article can receive intense heat applied to it and quenching means contacting it. In the instance of a lengthy hollow pipe 292 shown in FIG. 30, it is easy to envision that only the outside of the pipe can have an oxy/propane torch head 290, or other heating means, apply direct heat by flame points 290*a* to it. Tube 292 may travel downwardly through a hole in water bucket 291 containing water 291*a*. Around the hole it is possible to use a sealing means (not shown) to keep in most of the water that would leak out. The leaking water can be recirculated into the chiller unit, if used, and fed back up into the water bucket 291. It is inconvenient to apply heat to the inside of sections of very long continuous, closed cross section piping. The heat that reaches the inside surface of the pipe does so through conduction in the metal itself. As well, the act of quenching is accomplished as a cooling "shockwave" that proceeds from the outside pipe wall to the inside surface through a mode similar to cooling convection. Flat steel sheet need only be heated and quenched from one side to attain Colascitic, bainitic and/or martensitic, etc. microstructures.

FIG. 31 illustrates another aspect in which a microstructural transformation occurs on a previously stamped iron based article, such as an automotive hood 293, that has not yet been converted to Colascite, bainite and/or martensite, or any of the other high strength materials. In particular, an automotive panel such as a outer stamped hood panel 293 could be heat treated by flame heating 294a, using movable heating heads 294. In this aspect, quenching by quench unit 295 with quenchant 295a may be performed on both sides of the hood, while austenizing heat need only be applied to one side of the article. Additionally, the converse is also found to be effective. As in hollow piping, heat will conduct through the cross section of the article to fully austenize the material. For example, application of heat to only one side of a stamped article, whose outside surface of material (OSM) will be painted, leaves the OSM more uniform and ready to accept such painting treatment without the need to remove scale or other heat treating marks.

The resultant Colascitic grain size is controllable due to the magnitude of the austenization temperature. It has long been known that the size of the grain, and similarly modifiable bainitic platelet size, has a strong correlation to the mechanical properties of the steel. Smaller colascite/bainite platelets will typically yield higher strength and more elongation. More extreme temperatures in the vicinity of 1320° C. tend to yield larger grain size and larger colascitic/bainitic plates. Lesser temperatures around 980° C. to 1040° C. have a tendency to produce smaller grain and plate sizes. Therefore, it is desirable to austenize at lower temperatures before the higher temperature treatment of the present invention as to achieve a smaller grain size, with its resulting higher strength.

FIG. 32 shows a roll hemming aspect of the present invention. Roll hemming as shown in FIG. 32 is a process may be used to attach a layered panel of steel with another. An example of this occurs in the production of traditional automotive hood assemblies. The outer hood panel 296 is stamped with its outermost flanges at 90 degrees open to accept an inner hood panel 296a. Once inner door panel 296a has been placed inside outer hood panel 296, pressure applying rollers 298 are used to fold over, or hem, the outer hood panel's flanges 297 to lock the inner hood panel in place. As hood outer panels could be made from predominantly Colascitic steel, heat would be applied to the flange area to enable pressurized rolling to occur more easily. The heat could be applied through numerous means, including but not limited to, an oxy/propane torch 299 which applies heat immediately before the pressure applying rollers 298 hem the flange.

FIG. 33 illustrate a variation of the movable head concept that may apply to all methods of heating an iron based article as well as the quenching mechanisms. In this aspect, a locked together successive combination of heating and quenching units can be rolled up the length of a workpiece in the direction of arrow 318 to successively heat and quench the workpiece. The successive combination of heating and quenching units, such as heating 311, quenching 312, heating 313, quenching 314, heating 315, and quenching 316 of an iron based article can be developed with repeating or many varied microstructures and strength levels. It is possible that the entire article, or any portion thereof, may be thermally cycled to change the microstructure.

Still looking at FIG. 33, a first heating mechanism 311 will induce rapid austenization of the iron based article. The first quenching mechanism 312 will complete the immediate transformation to Colascite. The next heating mechanism 313 in the thermal cycling of the iron based article reheats portions of up to and including the entirety of the Colascite microstructure of the article. Tempering to a temperature below A1 where austenite starts to form, or intercritical annealing to a temperature between A1 and A3, i.e. A2, can be induced by this second heater 313 and it will occur in a relatively short time after the initial Colascite forming heat/quench. This tempering or annealing can be varied at levels of thermal intensity to affect different locations of the iron based article to yield various strength levels. The second quench may be applied by the quenching mechanism 314.

Third heater 315 is next to a third quencher 316. Although tempering is the more common thought, intercritical annealing may also be performed. The third temperature modification in the thermal cycling of the Colascite article may include an optional quench. Depending on the heating intensity applied to the Colascite article, this optional quench may or may not change the microstructure. In cases of low level tempering intensity, quenching may do little beyond reducing the waiting time before which the Colascite article can be easily locationally manipulated by mechanical conveyance. In cases of higher level tempering intensity, such as those involving intercritical annealing, this quench can induce the creation of multiphase microstructures by creating new austenite daughter phases in accordance with the third embodiment. In continued cycling, additional heating and quenching cycles may prove useful to further refine the Colascitic microstructure.

FIG. 33 shows an apparatus capable of this multiplicity of thermal cycling, which can be described as follows. To perform heating and quenching to nucleate Colascite, intercritical annealing portions of Colascite, and then tempering portions of Colascite, three heating heads would have three quenching heads interspersed in the pattern 311, 312, 313, 314, 315, and 316 as shown in FIG. 33. The first heating head 311 would follow the contour of the iron based article 319 as to rapidly austenize it to the desired temperature. The contour following path of head motion is denoted as 318. The first quenching head 312 would follow the article contour and immediately quench the article to form Colascite. The second contour following heating head 313 would raise the temperature of the article to appropriately induce intercritical annealing. The second quenching mechanism 314 could lower the articles temperature to modify Colascite to the desired microstructure. The third contour following heating method 315 would once again raise the temperature to the desired thermal level to induce tempering. The third, and optional, quenching means 316 would finally lower the temperature of the article to be locationally manipulated.

FIG. 34 shows another configuration that would accomplish the same results by incorporating multiple passes of a lesser number of heating/quenching mechanisms. For example, in the first path of motion 328, the contour following heating means 321 could rapidly austenize the iron based article 329. The first pass of the contour following quenching means 322 would form the Colascite microstructure. The heating means could then initiate an intercritical annealing step by following the same path of motion 328 it had followed during complete austenization, just at lower intensity to the appropriate temperature. The quenching means would similarly follow the same motion as before to appropriately change the microstructure. As a final step, the heating and quenching means would follow the path of motion 328 for a third time to temper and optionally quench the iron based article.

Any multiplicity of the above embodiments could occur for a specific application. It is possible that the aforementioned H,Q,H,Q,H,Q thermal application head could actually be Q,H,Q for different inverse paths of motion or any other combination that will suit this application for a specific iron based article.

In reference to all the above heating operations, many methods of imparting heat to the iron based article will work in both reactive and non-reactive atmospheres. The atmospheric pressure is equally modifiable to desired levels of pressure for various purposes. Electric resistance, magnetic, laser, x-ray, induction, gaseous fuel, and many other methods known to those skilled in the art will suffice to develop rapid austenization of the iron based article.

Regarding quenching operations, both reactive and non-reactive gaseous, liquids, and solids may suffice to adequately quench the iron based article. Liquids may be organic or inorganic. Appropriately temperatured water, salts, zinc, aliphatic and non-aliphatic oils, and the like may constitute the quenching bath. In the case of solid and semi-solid quenchants, metallic salts, powders, and particulates with their mesh size ranging from talc to that of pea gravel will suffice.

While this potential multiplicity of thermal cycling is occurring, coatings with desired properties may be applied by creating conditions conducive to such activity. Applying coatings such as silaceous carbide, zinc for galvanizing, and titanium nitride may all benefit the iron based article's properties if applied at the appropriate temperatures required. Other coatings exist, as the above three mentioned being only examples in a list of options too numerous to mention.

In accordance with the above, the present invention has been practiced with many variations, especially those in the areas of temperature control with various transformations having occurred, when following the process of the present invention. Temperature control is an important aspect of this invention and its control is important to the formation of various partially and fully transformed Colascitic portions of iron-based alloys.

INDUSTRIAL APPLICABILITY

This invention finds industrial applicability for making and using high strength steel for automobile components, in the construction industry, transportation infrastructure, heavy construction equipment, anti-ballistics and armored products, ship building, and for consumer products.

What is claimed is:

1. Apparatus for micro-treating a low, medium, or high carbon iron-based alloy workpiece of a first microstructure having an austenitic conversion temperature to form at least one phase of a high strength alloy, comprising:
   a micro-heating unit for rapidly heating at least a portion of the low carbon iron-based alloy workpiece to a selected temperature, said micro-heating unit being capable of rapidly heating the workpiece to a temperature above the austenitic conversion temperature;
   a quenching unit positioned adjacent the micro-heating unit for rapidly quenching the heated iron-based alloy; and
   a control unit for controlling and transporting the iron-based alloy workpiece through the micro-heating unit and the quenching unit during the rapid heating and rapid quenching to form at least one phase of a high strength alloy upon being rapidly heated to said selected temperature and then being rapidly quenched.

2. The apparatus of claim 1, wherein the selected temperature is at least between about 723° C. to about 1450° C.

3. The apparatus of claim 1, wherein the heating unit is selected from the group consisting of electric resistance heaters, fluidized beds, electric furnaces, plasma furnaces, microwave ovens, open environment propane forges, gas fired units, solid fuels, high temperature salt baths, torches and any combination thereof.

4. The apparatus of claim 1, wherein the heating unit is selected from the group consisting of stationary heating heads, heated warm forms, heated sheet stamp dies, heated conventional dies, heated progressive dies, heated line dies, heated roll forming dies, heated four slide dies, heated hydroforming units, side-to-side movable heaters, hinged movable heaters, heated environment pressure form units, and combinations therefore.

5. The apparatus of claim 1, wherein the quenching unit adapts a quenching means selected from the group consisting of water, water-containing aqueous solutions, oil, molten salt, brine solutions, air, and powders.

6. The apparatus of claim 1, wherein the heating unit includes propane torches having blaster nozzles and a valve control operably connected to said blaster nozzles for effecting heating control.

7. The apparatus of claim 1, wherein the quenching unit includes a water bucket with water therein as a quenching medium to cool the low carbon iron-based alloy and a chiller connected to the water bucket to keep the water at a suitable temperature.

8. The apparatus of claim 1, further comprising a heat resistant insulator located between the heating unit and quenching unit to insulate the heating unit from the quenching unit and to straighten the moving low carbon iron-based alloy while it is being heated and quenched.

9. Apparatus for micro-treating an article made of a low, medium, or high carbon iron-based alloy having an austenitic conversion temperature to form a high strength steel article, comprising:
   a movable head heating unit having a rapid heating rate for heating the carbon iron-based alloy to a selected temperature below its;
   a quenching unit positioned adjacent the heating unit for rapidly quenching the heated low carbon iron-based alloy;
   spaced first and second tensioning units positioned on opposite sides of said heating and quenching units for moving said low carbon iron-based alloy article through said heating and quenching units, and
   a computer control unit for controlling and adjusting the feed rate of the first tensioning unit, the draw rate of the second tensioning unit, the heating rate of the heating unit and the cooling rate of the quenching unit, whereby the low carbon iron-based alloy has a varying thickness.

10. The apparatus of claim 9, wherein the selected temperature is at least between about 1040° C. to about 1270° C.

11. The apparatus of claim 9, wherein the movable heating unit is selected from the group consisting of electric resistance heaters, fluidized beds, electric furnaces, plasma furnaces, microwave ovens, open environment propane forges, gas fired units, solid fuels, high temperature salt baths, torches and any combination thereof.

12. The apparatus of claim 9, wherein the movable heating unit includes propane torches having blaster nozzles and a valve control operably connected to said blaster nozzles for effecting heating control.

13. The apparatus of claim 9, wherein the quenching unit adapts a quenching means selected from the group consisting of water, water-containing aqueous solutions, oil, molten salt, brine solutions, air, and powders.

14. The apparatus of claim 9, wherein the quenching unit includes a water bucket with water therein as a quenching medium to cool the low carbon iron-based alloy and a chiller connected to the water bucket to keep the water bucket at suitable temperature.

15. The apparatus of claim 9, further comprising a heat resistant insulator located between the heating and quenching units to insulate the heating unit from the quenching unit and to straighten the moving strip steel while it is being heated and quenched.

16. The apparatus of claim 9, wherein the first and second tensioning units are selected from the group consisting of drawing rollers, drive capstans, and elongation drives.

17. Apparatus for micro-treating an iron-based alloy workpiece having an austenitic conversion temperature, comprising:
- a set of gas fired torches having a heating rate of 420° C. to 4,000° C. per second for heating the iron-based alloy workpiece to a first selected temperature above the austenitic conversion temperature;
- a water cooling unit connected to a chiller to maintain an ambient temperature water, said unit being positioned adjacent the gas fired torches for rapidly quenching the heated iron-based alloy;
- spaced first and second set of tensioning rollers positioned on opposite sides of the gas fired torches and the water bucket for moving said heated iron-based alloy workpiece through the gas fired torches and the water bucket,
- a heat resistant insulator located between the gas fired torches and the water bucket to insulate the heating unit from the quenching unit and to straighten the moving the iron-based alloy workpiece while heated and quenched; and
- a control unit for controlling the heating rate of the gas fired torch and the cooling rate of the water bucket, whereby the iron-based alloy forms into high strength steel.

18. The apparatus of claim 17, wherein the first selected temperature is at least between about 1040° C. to about 1270° C.

19. The apparatus of claim 17, wherein the set of gas fired torches including propane torches have blaster nozzles and a valve control operably connected to said blaster nozzles for effecting heating control.

20. The apparatus of claim 17, wherein the water cooling unit includes a water bucket with water therein to quench the heated iron-based alloy and a water holding reservoir to collect additional water from the water bucket.

21. The apparatus of claim 17, wherein the first and second set of tensioning rollers are hydraulic pressure powered.

22. The apparatus of claim 17, wherein the heat resistant insulator includes a ceramic plate and a carbon sheet wrapping around the ceramic plate.

23. The apparatus of claim 17, wherein the control unit is computer controlled.

\* \* \* \* \*